(12) United States Patent
Wiegand et al.

(10) Patent No.: US 9,113,167 B2
(45) Date of Patent: Aug. 18, 2015

(54) CODING A VIDEO SIGNAL BASED ON A TRANSFORM COEFFICIENT FOR EACH SCAN POSITION DETERMINED BY SUMMING CONTRIBUTION VALUES ACROSS QUALITY LAYERS

(75) Inventors: Thomas Wiegand, Berlin (DE); Heiner Kirchhoffer, Berlin (DE); Heiko Schwarz, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 999 days.

(21) Appl. No.: 12/511,875

(22) Filed: Jul. 29, 2009

(65) Prior Publication Data
US 2010/0020867 A1 Jan. 28, 2010

Related U.S. Application Data

(62) Division of application No. 12/523,308, filed as application No. PCT/EP2007/003411 on Apr. 18, 2007.

(60) Provisional application No. 60/885,534, filed on Jan. 18, 2007.

(51) Int. Cl.
*H04N 19/34* (2014.01)
*H04N 19/61* (2014.01)

(52) U.S. Cl.
CPC .............. *H04N 19/34* (2014.11); *H04N 19/61* (2014.11)

(58) Field of Classification Search
CPC .......... H04N 9/00442; H04N 9/00424; H04N 9/00448
See application file for complete search history.

(56) References Cited

U.S. PATENT DOCUMENTS 5,253,055 A 10/1993 Civanlar et al.
2003/0118243 A1* 6/2003 Sezer et al. ................... 382/245
(Continued)

FOREIGN PATENT DOCUMENTS

CN 1685731 10/2005
JP H11-41600 6/1989
(Continued)

OTHER PUBLICATIONS

Kondi, L.P. et al.; "On Video SNR Scalability"; Oct. 1998; Int'l Conference on Image Processing, pp. 934-938; Chicago, IL.
(Continued)

*Primary Examiner* — William C Vaughn, Jr.
*Assistant Examiner* — Michael J Hess
(74) *Attorney, Agent, or Firm* — Michael A. Glenn; Perkins Coie LLP

(57) ABSTRACT

An apparatus for generating a quality-scalable video data stream includes a coder for coding a video signal using block-wise transformation to obtain transform blocks of transformation coefficient values for a picture of the video signal, a predetermined scan order with possible scan positions being defined among the transformation coefficient values within the transform blocks so that in each transform block, for each possible scan position, at least one of the transformation coefficient values within the respective transform block belongs to the respective possible scan position; and a generator for forming, for each of a plurality of quality layers, a video sub-data stream containing scan range information indicating a sub-set of the possible scan positions, and transform coefficient information on transformation coefficient values belonging to the sub-set of possible scan positions such that the sub-set of each quality layer includes at least one possible scan position not included by the sub-set of any other of the plurality of quality layers.

19 Claims, 14 Drawing Sheets

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | ... |
|---|---|---|---|---|---|---|---|---|---|----|----|----|----|----|----|----|----|----|----|----|----|----|----|----|----|-----|
|122|130|110|105|120|70|40|11|32|25|10|9| | | | | | | | | | | | | | | |
| | | | | | |0|11|0|0|13|10|15|0|0|17|11|9|16|0|0|9| | | | | |
| | | | | | | | | |8|3|0|0|0|0|4|2|0|5|0|3|2|...| | | | |

(56) References Cited

U.S. PATENT DOCUMENTS

| | | | |
|---|---|---|---|
| 2004/0066974 | A1 | 4/2004 | Karczewicz et al. |
| 2004/0114683 | A1 | 6/2004 | Schwarz et al. |
| 2005/0030205 | A1* | 2/2005 | Konoshima et al. ............ 341/50 |
| 2006/0008002 | A1 | 1/2006 | Kirenko |
| 2006/0230162 | A1* | 10/2006 | Chen et al. .................... 709/229 |
| 2006/0233255 | A1* | 10/2006 | Ridge et al. .............. 375/240.18 |
| 2007/0160133 | A1* | 7/2007 | Bao et al. .................... 375/240.1 |
| 2007/0223580 | A1* | 9/2007 | Ye et al. .................... 375/240.12 |
| 2007/0230564 | A1* | 10/2007 | Chen et al. ............... 375/240.01 |
| 2007/0237239 | A1* | 10/2007 | Jeon et al. ................ 375/240.24 |
| 2009/0219988 | A1* | 9/2009 | Cammas et al. ......... 375/240.01 |

FOREIGN PATENT DOCUMENTS

| | | |
|---|---|---|
| JP | H06-98308 | 4/1994 |
| JP | 2001258029 | 9/2001 |
| JP | 2006500849 | 1/2006 |
| JP | 2006501740 | 1/2006 |
| KR | 1020050061483 | 6/2005 |
| WO | WO98/37698 | 8/1998 |
| WO | WO2004/030368 | 4/2004 |

OTHER PUBLICATIONS

Kondi, L.P. et al.; "An Optimal Single Pass SNR Scalable Video Coder"; Oct. 1999; Int'l Conference on Image Processing; Kobe, Japan and Piscataway, NJ.

Clarke, R.J.; "Digital Compression of Still Images and Video"; 1995; pp. 388-391; Academic Press, UK, XP002462014.

Marpe, D. et al.; "Context-Based Adaptive Binary Arithmetic Coding in JVT/H.26L"; Sep. 2002; Int'l Conference on Image Processing, vol. 2, pp. 513-516; Rochester, NY.

Bjontegaard, G. et al.; "Context-Adaptive VLC (CVLC) Coding of Coefficients"; May 2002; Joint Video Team (JVT) of ISO/IEC MPEG & ITU-T VCEG (ISO/IEC JTC1/SC29/WG11 and ITU-T SGI6 Q6) $3^{rd}$ meeting; pp. 1-8, XP002257292, Fairfax, VA.

ITU-T Recommendation H.262, International Standard ISO/IEC 13818.2 MPEG-2 Video. "Transmission of Non-Telephone Signals. Information Technology—Generic Coding of Moving Pictures and Associated Audio Information: Video"; Jul. 1995; ITU-T Telcommunication Standardization Sector of ITU, pp. 1-211, XP000198491; Geneva, Switzerland.

"Joint Scalable Video Model JSVM-8"; Oct. 2006; $21^{st}$ Meeting, Video Standards and Drafts, Document JVT-U202, XP030006799.

Ridge, Justin et al., "Simplification and Unification of FGS, Joint Video Tema (JVT) of ISO/IEC MPEG & ITU-T VCEG", (ISO/IEC JTC1/SC 29/WG11 and ITU-T SG16 Q.6), 19th Meeting: Geneva, CH, Apr. 2006, JVT-S077, pp. 1-12.

English Translation of Korean Notice Requesting Submission of Opinion, mailed Dec. 21, 2010, in related Korean patent application No. 10-2009-7015099, 5 pages.

* cited by examiner

FIG 6A

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | ... |
|---|---|---|---|---|---|---|---|---|---|----|----|----|----|----|----|----|----|----|----|----|----|----|----|----|----|-----|
| 122 | 130 | 110 | 105 | 120 | 70 | 40 | 0 | 32 | 25 | 0 | 0 | 0 | 0 | 0 | 0 | 0 | 0 | 0 | 0 | 0 | 0 | 0 | 0 | 0 | 0 | ... |
| 0 | 0 | 0 | 0 | 0 | 0 | 0 | 22 | 0 | 0 | 23 | 19 | 15 | 0 | 0 | 17 | 11 | 9 | 16 | 0 | 0 | 9 | 0 | 0 | 0 | 0 | |
| 0 | 0 | 0 | 0 | 0 | 0 | 0 | 0 | 0 | 0 | 0 | 0 | 0 | 8 | 3 | 0 | 0 | 0 | 0 | 4 | 2 | 0 | 5 | 0 | 3 | 2 | ... |

FIG 6E

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | ... |
|---|---|---|---|---|---|---|---|---|---|----|----|----|----|----|----|----|----|----|----|----|----|----|----|----|----|-----|
| 122 | 130 | 110 | 105 | 120 | 70 | 40 | 0 | 32 | 25 | 0 | | | | | | | | | | | | | | | 25 | ... |
| 0 | 0 | 0 | 0 | 0 | 0 | 0 | 22 | 0 | 0 | 23 | 19 | 15 | 0 | 0 | 17 | 11 | 9 | 16 | 0 | 0 | 9 | | | | | |
| 0 | 0 | 0 | 0 | 0 | 0 | 0 | 0 | 0 | 0 | 0 | 0 | 0 | 8 | 3 | 0 | 0 | 0 | 0 | 4 | 2 | 0 | 5 | 0 | 3 | 2 | ... |

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | ... |
|---|---|---|---|---|---|---|---|---|---|---|---|---|---|---|---|---|---|---|---|---|---|---|---|---|---|---|
| 122 | 130 | 110 | 105 | 120 | 70 | 40 | 0 | 32 | 25 | 0 | 0 | 0 | 0 | 0 | 0 | 0 | 0 | 0 | 0 | 0 | 0 | 0 | 0 | 0 | 0 | |
| | | | | | | | 22 | 0 | 0 | 0 | 0 | 0 | 0 | 0 | 0 | 0 | 0 | 0 | 0 | 0 | 0 | 0 | 0 | 0 | 0 | |
| | | | | | | | | | | 23 | 19 | 15 | 0 | 0 | 17 | 11 | 9 | 16 | 0 | 0 | 9 | 0 | 0 | 0 | 0 | |
| | | | | | | | | | | | | | 8 | 3 | 0 | 0 | 0 | 4 | 2 | 0 | 0 | 5 | 0 | 3 | 2 | |

FIG 6C

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | ... |
|---|---|---|---|---|---|---|---|---|---|---|---|---|---|---|---|---|---|---|---|---|---|---|---|---|---|---|
| 122 | 130 | 110 | 105 | 120 | 70 | 40 | 22 | 32 | 25 | 23 | 19 | | | | | | | | | | | | | | | |
| | | | | | | | | | | | | 15 | 8 | 3 | | | 17 | 11 | 9 | 16 | | | | | | |
| | | | | | | | | | | | | | | | | | | 4 | 2 | | 9 | | | | | |
| | | | | | | | | | | | | | | | | | | | | | | 5 | 0 | 3 | 2 | |

FIG 6G

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | ... |
|---|---|---|---|---|---|---|---|---|---|----|----|----|----|----|----|----|----|----|----|----|----|----|----|----|----|-----|
| 122 | 130 | 110 | 105 | 120 | 70 | 40 | 11 | 32 | 25 | 10 | 9 | | | | | | | | | | | | | | | |
| | | | | | | 0 | 11 | 0 | 0 | 10 | 9 | 15 | 0 | 0 | 17 | 11 | 9 | 16 | 0 | 0 | 9 | | | | | |
| | | | | | | | | | | | | | 8 | 3 | 0 | 0 | 0 | 0 | 4 | 2 | 0 | 5 | 0 | 3 | 2 | |

```
residual_block_cavlc( coeffLevel, startIdx, endIdx, maxNumCoeff) {
    for(i=0; i<maxNumCoeff; i++)
        coeffLevel[ i ]                                           } 280
    coeff_token                                           ← 240
    if( total_coeff( coeff_token) >0){                   ← 242
        for( i=0;i<total_coef(coeff_token); i++)          ← 244
            if(i<trailing_ones(coeff_token)){             ← 248
                trailing_ones_sign_flag                   ← 246
                level[ i ] =1 - 2 * trailing_onessign_flag ← 250
            } else {
                coeff_level                               ← 252
                level [ i ]=coeff_level                   ← 254
            }
        if( total_coeff( coeff_token )<endIdx-startIdx+1){ ← 256
            total_zeros                                   ← 258
            zerosLeft=total_zeros                         ← 260
        } else
            zerosLeft=0
        for(i=0;i<total_coeff(coeff_token)-1;i++){        ← 262
            if( zerosLeft>0){                             ← 270
                run_before                                ← 264
                run[ i ]=run_before                       ← 266
            }else
                run[ i ]= 0                               ← 272
            zerroLeft=zerosLeft-run[ i ]                  ← 268
        }
        run[total_coeff(coeff_token)-1]=zerosLeft         ← 274
        coeffNum=-1                                       ← 278
        for(i=total_coeff(coeff_token)-1;i>=0;i--) {      }
            coeffNum+=run[i] + 1                          } 276
            coeffLevel[startIdx+coeffNum]=level[i]        }
        }
    }
}
```

FIG 8

```
residual_block_cabac( coeffLevel, startIdx, endIdx, maxNumCoeff) {
  if( maxNumCoeff==64)
    coded_block_flag=1
  else
    coded_block_flag
  for(i=0; i<maxNumCoeff;i++)
    coeffLevel[ i ]=0                                          } 322
  if(coded_block_flag){
    numCoeff=maxNumCoeffendIdx+1
    i=0starrtIdx
    do {
      significant_coeff_flag[ i ]              ←—— 312
      if(significant_coeff_flag[ i ]){         ←—— 314
        last_significant_coeff_flag[ i ]       ←—— 316
        if (last_significant_coeff_flag[ i ]){ ←—— 318
          numCoeff=i+1                         ←—— 320
        }
      }
      i++                                      ←—— 310
    } while( i < numCoeff-1)
    coeff_abs_level_minus1[numCoeff-1]
    coeff_sign_flag[numCoeff-1]                                } 324
    coeffLevel[ numCoeff-1 ] =
      (coeff_abs_level_minus1[numCoeff-1]+1) *                 } 326
      (1-2*coeff_sign_flag[numCoeff-1])
    for( i=numCoeff-2;i>=0;i--)              ——— 332
      if(significant_coeff_flag[ i ]) {      ←—— 330
        coeff_abs_level_minus1[ i ]
        coeff_sign_flag[ i ]                                   } 328
        coeffLevel[ i ]=(coeff_abs_level_minus1[ i ]+1)*
                       (1-2*coeff_sign_flag[ i ])
      }
  }
}
```

FIG 9

CODING A VIDEO SIGNAL BASED ON A TRANSFORM COEFFICIENT FOR EACH SCAN POSITION DETERMINED BY SUMMING CONTRIBUTION VALUES ACROSS QUALITY LAYERS

CROSS-REFERENCE TO RELATED APPLICATIONS

This application is divisional of U.S. patent application Ser. No. 12/523,308 filed 15 Jul. 2009, which is a U.S. national entry of PCT Patent Application Serial No. PCT/EP2007/003411 filed 18 Apr. 2007, and claims priority to U.S. patent application No. 60/885,534 filed 18 Jan. 2007, which are incorporated herein by references in their entirety.

BACKGROUND OF THE INVENTION

The present invention relates to quality-scalable video data streams, their generation and decoding such as the generation and decoding of video data streams obtained by use of block-wise transformation.

The current Joint Video Team "JVT" of the ITU-T Video Coding Experts Group in the ISO/IEC Moving Pictures Expert Group (MPEG) is currently specifying a scalable extension of the H.264/MPEG4-AVC video coding standard. The key feature of the scalable video coding (SVC) in comparison to conventional single layer encoding is that various representations of a video source with different resolutions, frame rates and/or bit-rates are provided inside a single bit stream. A video representation with a specific spatio-temporal resolution and bit-rate can be extracted from a global SVC bit-stream by simple stream manipulations as packet dropping. As an important feature of the SVC design, most components of H.264/MPG4-AVC are used as specified in the standard. This includes the motion-compensated and intra prediction, the transform and entropy coding, the deblocking as well as the NAL unit packetization (NAL=Network Abstraction Layer). The base layer of an SVC bit-stream is generally coded in compliance with the H.264-MPEG4-AVC, and thus each standard conforming H.264-MPEG4-AVC decoder is capable of decoding the base layer representation when it is provided with an SVC bit-stream. New tools are only added for supporting spatial and SNR scalability.

For SNR scalability, coarse-grain/medium-grain scalability (CGS/MGS) and fine-grain scalability (FGS) are distinguished in the current Working Draft. Coarse-grain or medium-grain SNR scalable coding is achieved by using similar concepts as for spatial scalability. The pictures of different SNR layers are independently coded with layer specific motion parameters. However, in order to improve the coding efficiency of the enhanced layers in comparison to simulcast, additional inter-layer prediction mechanisms have been introduced. These prediction mechanisms have been made switchable so that an encoder may freely choose which base layer information should be exploited for an efficient enhancement layer coding. Since the incorporated inter-layer prediction concepts include techniques for motion parameter and residual prediction, the temporal prediction structures of the SNR layers should be temporally aligned for an efficient use of the inter-layer prediction. It should be noted that all NAL units for a time instant form an excess unit and thus have to follow each other inside an SVC bit-stream. The following three inter-layer predication techniques are included in the SVC design.

The first one is called inter-layer motion prediction. In order to employ base-layer motion data for the enhancement layer coding, an additional macroblock mode has been introduced into SNR enhancement layers. The macroblock partitioning is obtained by copying the partitioning of the co-located macroblock in the base layer. The reference picture indices as well as the associated motion vectors are copied from the co-located base layer blocks. Additionally, a motion vector of the base layer can be used as a motion vector predictor for the conventional macroblock modes.

The second technique of redundancy reduction among the various quality layers is called inter-layer residual prediction. The usage of inter-layer residual prediction is signaled by a flag (residual_prediction_flag) that is transmitted for all inter-coded macroblocks. When this flag is true, the base layer signal of the co-located block is used as prediction for the residual signal of the current macroblock, so that only the corresponding difference signal is coded.

Finally, inter-layer intra prediction is used in order to exploit redundancy among the layers. In this intra-macroblock mode, the prediction signal is built by the co-located reconstruction signal of the base layer. For the inter-layer intraprediction it is generally necessitated that base layers are completely decoded including the computationally complex operations of motion-compensation prediction and deblocking. However, it has been shown that this problem can be circumvented when the inter-layer intra prediction is restricted to those parts of the lower layer picture that are intra-coded. With this restriction, each supported target layer can be decoded with a single motion compensation loop. This single-loop decoding mode is mandatory in the scalable H.264-MPEG4-AVC extension.

Since inter-layer intraprediction can only be applied when the co-located macroblock is intra-coded and the inter-layer motion prediction with inferring the macroblock type can be only applied when the base layer macroblock is inter-coded, both modes are signaled via a single syntax element base_mode_flag on a macroblock level. When this flag is equal to 1, inter-layer intraprediction is chosen when the base layer macroblock is intra-coded. Otherwise, the macroblock mode as well as the reference indices and motion vectors are copied from the base layer macroblock.

In order to support a finer granularity than CGS/MGS coding, so-called progressive refinement slices have been introduced which enable finer granular SNR scalable coding (FGS). Each progressive refinement slice represents a refinement of the residual signal that corresponds to a bisection of the quantization steps size (QP increase of 6). These signals are represented in a way that only a single inverse transform has to be performed for each transform block at the decoder side. The ordering of transform coefficient levels in progressive refinements slices allows the corresponding NAL units to be truncated at any arbitrary byte-aligned point, so that the quality of the SNR base layer can be refined in a fine-granular way. In addition to a refinement of the residual signal, it is also possible to transmit a refinement of motion parameters as part of the progressive refinement slices.

One drawback of the FGS coding in the current SVC draft is that it significantly increases the decoder complexity in comparison to CGS/MGS coding. On the one side the transform coefficients in a progressive refinement slice are coded using several scans over the transform blocks, and in each scan only a few transform coefficient levels are transmitted. For the decoder this increases the complexity since a higher memory bandwidth is needed, because all transform coefficient levels from different scans need to be collected before the inverse transform can be carried out. On the other side, the parsing process for progressive refinement slices is dependent on the syntax elements of the corresponding base layer slices.

The order of syntax elements as well as the codeword tables for VLC coding or the probability model selection for arithmetic coding depend on the syntax elements in the base layer. This further increases the memory bandwidth for decoding, since the syntax elements of the base layer need to be accessed during the parsing of the enhancement layer.

Furthermore, the special property of progressive refinement slices that they can be truncated is difficult to use in today's packet switch networks. Usually, a media aware network device will either deliver or drop a packet of a scalable bit-stream. And the only error that will be visible at the application layer is a packet loss.

Therefore, not only in view of the above H.264-MPEG4-AVC but also with other video compression techniques, it would be desirable to have a coding scheme that is better adapted to the today's needs showing packet loss rather than byte-wise truncation problems.

SUMMARY

In accordance with an embodiment, an apparatus for reconstructing a video signal from a quality-scalable video data stream having, for each of a plurality of quality layers, a video sub-data stream, may have: a parser for parsing the video sub-data streams of the plurality of quality layers, to acquire, for each quality layer, a scan range information and transform coefficient information on two-dimensionally arranged transformation coefficient values of different transform blocks, wherein a predetermined scan order with possible scan positions orders the transformation coefficient values into a linear sequence of transformation coefficient values, and the scan range information indicates a sub-set of the possible scan positions, the sub-set forming a continuous sequence of the possible scan positions; a constructor for, using the scan range information, for each quality layer, constructing the transform blocks by associating the transformation coefficient values of the respective transform blocks from the transform coefficient information to the sub-set of the possible scan positions; and a reconstructor for reconstructing a picture of the video signal by a back-transformation of the transform blocks, wherein the parser is configured to expect, for each of the plurality of quality layers, the scan range information to have two syntax elements one of which indicates a first scan position among the possible scan positions within the sub-set of possible scan positions in the predetermined scan order and the other one of which indicates a last scan position among the possible scan positions within the sub-set of possible scan positions in the predetermined scan order.

In accordance with another embodiment, an apparatus for generating a quality-scalable video data stream may have: a coder for coding a video signal using block-wise transformation to acquire transform blocks of two-dimensionally arranged transformation coefficient values for a picture of the video signal, wherein a predetermined scan order with possible scan positions orders the transformation coefficient values into a linear sequence of transformation coefficient values; and a generator for forming, for each of a plurality of quality layers, a video sub-data stream having scan range information indicating a sub-set of the possible scan positions, the sub-set forming a continuous sequence of the possible scan positions, and transform coefficient information on transformation coefficient values belonging to the sub-set of possible scan positions such that the sub-set of each quality layer has at least one possible scan position not included by the sub-set of any other of the plurality of quality layers, wherein the generator is configured such that, for each of the plurality of quality layers, the scan range information has two syntax elements one of which indicates a first scan position among the possible scan positions within the sub-set of possible scan positions in the predetermined scan order and the other one of which indicates a last scan position among the possible scan positions within the sub-set of possible scan positions in the predetermined scan order.

In accordance with another embodiment, a method for generating a quality-scalable video data stream may have the steps of: coding a video signal using block-wise transformation to acquire transform blocks of two-dimensionally arranged transformation coefficient values for a picture of the video signal, wherein a predetermined scan order with possible scan positions orders the transformation coefficient values into a linear sequence of transformation coefficient values; and forming, for each of a plurality of quality layers, a video sub-data stream having scan range information indicating a sub-set of the possible scan positions, the sub-set forming a continuous sequence of the possible scan positions, and transform coefficient information on transformation coefficient values belonging to the sub-set of possible scan positions such that the sub-set of each quality layer has at least one possible scan position not included by the sub-set of any other of the plurality of quality layers, wherein the forming is performed such that, for each of the plurality of quality layers, the scan range information has two syntax elements one of which indicates a first scan position among the possible scan positions within the sub-set of possible scan positions in the predetermined scan order and the other one of which indicates a last scan position among the possible scan positions within the sub-set of possible scan positions in the predetermined scan order.

In accordance with another embodiment, a method for reconstructing a video signal from a quality-scalable video data stream having, for each of a plurality of quality layers, a video sub-data stream, may have the steps of: parsing the video sub-data streams of the plurality of quality layers, to acquire, for each quality layer, a scan range information and transform coefficient information on two-dimensionally arranged transformation coefficient values of different transform blocks, wherein a predetermined scan order with possible scan positions orders the transformation coefficient values into a linear sequence of transformation coefficient values, and the scan range information indicates a sub-set of the possible scan positions, the sub-set forming a continuous sequence of the possible scan positions; using the scan range information, for each quality layer, constructing the transform blocks by associating the transformation coefficient values of the respective transform blocks from the transform coefficient information to the sub-set of the possible scan positions; and reconstructing a picture of the video signal by a back-transformation of the transform blocks, wherein in parsing the video sub-data streams, for each of the plurality of quality layers, the scan range information is expected to have two syntax elements one of which indicates a first scan position among the possible scan positions within the sub-set of possible scan positions in the predetermined scan order and the other one of which indicates a last scan position among the possible scan positions within the sub-set of possible scan positions in the predetermined scan order.

Another embodiment may have a quality-scalable video data stream enabling a reconstruction of a video signal having, for each of a plurality of quality layers, a scan range information and transform coefficient information on two-dimensionally arranged transformation coefficient values of different transform blocks, wherein a predetermined scan order with possible scan positions orders the transformation coefficient values into a linear sequence of the transformation coefficient values, and the scan range information indicates a sub-set of the possible scan positions, the sub-set forming a continuous sequence of the possible scan positions, wherein the transform coefficient information concerns transformation coefficient values belonging to the sub-set of possible scan positions, wherein, for each of the plurality of quality layers, the scan range information has two syntax elements one of which indicates a first scan position among the possible scan positions within the sub-set of possible scan positions in the predetermined scan order and the other one of which indicates a last scan position among the possible scan positions within the sub-set of possible scan positions in the predetermined scan order.

In accordance with another embodiment, a computer-program may have a program code for performing, when running on a computer, a method for generating a quality-scalable video data stream, the method having the steps of: coding a video signal using block-wise transformation to acquire transform blocks of two-dimensionally arranged transformation coefficient values for a picture of the video signal, wherein a predetermined scan order with possible scan positions orders the transformation coefficient values into a linear sequence of transformation coefficient values; and forming, for each of a plurality of quality layers, a video sub-data stream having scan range information indicating a sub-set of the possible scan positions, the sub-set forming a continuous sequence of the possible scan positions, and transform coefficient information on transformation coefficient values belonging to the sub-set of possible scan positions such that the sub-set of each quality layer has at least one possible scan position not included by the sub-set of any other of the plurality of quality layers, wherein the forming is performed such that, for each of the plurality of quality layers, the scan range information has two syntax elements one of which indicates a first scan position among the possible scan positions within the sub-set of possible scan positions in the predetermined scan order and the other one of which indicates a last scan position among the possible scan positions within the sub-set of possible scan positions in the predetermined scan order.

In accordance with another embodiment, a computer-program may have a program code for performing, when running on a computer, a method for reconstructing a video signal from a quality-scalable video data stream having, for each of a plurality of quality layers, a video sub-data stream, the method having the steps of: parsing the video sub-data streams of the plurality of quality layers, to acquire, for each quality layer, a scan range information and transform coefficient information on two-dimensionally arranged transformation coefficient values of different transform blocks, wherein a predetermined scan order with possible scan positions orders the transformation coefficient values into a linear sequence of transformation coefficient values, and the scan range information indicates a sub-set of the possible scan positions, the sub-set forming a continuous sequence of the possible scan positions; using the scan range information, for each quality layer, constructing the transform blocks by associating the transformation coefficient values of the respective transform blocks from the transform coefficient information to the sub-set of the possible scan positions; and reconstructing a picture of the video signal by a back-transformation of the transform blocks, wherein in parsing the video sub-data streams, for each of the plurality of quality layers, the scan range information is expected to have two syntax elements one of which indicates a first scan position among the possible scan positions within the sub-set of possible scan positions in the predetermined scan order and the other one of which indicates a last scan position among the possible scan positions within the sub-set of possible scan positions in the predetermined scan order.

In accordance with an embodiment of the present invention, an apparatus for generating a quality-scalable video data stream, comprises means for coding a video signal using block-wise transformation to obtain transform blocks of transformation coefficient values for a picture of the video signal, a predetermined scan order with possible scan positions being defined among the transformation coefficient values within the transform blocks so that in each transform block, for each possible scan position, at least one of the transformation coefficient values within the respective transform block belongs to the respective possible scan position; and means for forming, for each of a plurality of quality layers, a video sub-data stream containing scan range information indicating a sub-set of the possible scan positions, and transform coefficient information on transformation coefficient values belonging to the sub-set of possible scan positions such that the sub-set of each quality layer comprises at least one possible scan position not comprised by the sub-set of any other of the plurality of quality layers.

Further, in accordance with an embodiment of the present invention, an apparatus for reconstructing a video signal from a quality-scalable video data stream comprising, for each of a plurality of quality layers, a video sub-data stream, comprises means for parsing the video sub-data streams of the plurality of quality layers, to obtain, for each quality layer, a scan range information and transform coefficient information on transformation coefficient values of different transform blocks, a predetermined scan order with possible scan positions being defined among the transformation coefficient values within the transform blocks so that in each transform block, for each possible scan position, at least one of the transformation coefficient values within the respective transform block belongs to the respective possible scan position, and the scan range information indicating a sub-set of the possible scan positions; means for, using the scan range information, for each quality layer, constructing the transform blocks by associating the transformation coefficient values of the respective transform blocks from the transform coefficient information to the sub-set of the possible scan positions; and means for reconstructing a picture of the video signal by a back-transformation of the transform blocks.

BRIEF DESCRIPTION OF THE DRAWINGS

Embodiments of the present invention will be detailed subsequently referring to the appended drawings, in which:

FIGS. 6a-6g show schematic diagrams of a scanned portion of a transform block and its partitioning into sub-layers according to several embodiments;

FIG. 8 shows a pseudo-code illustrating the coding of the transform coefficient levels belonging to a specific sub-data stream according to an embodiment;

FIG. 9 shows a pseudo-code illustrating another example for coding the transform coefficient levels belonging to a specific sub-data stream;

DETAILED DESCRIPTION OF THE INVENTION

Figure 1:
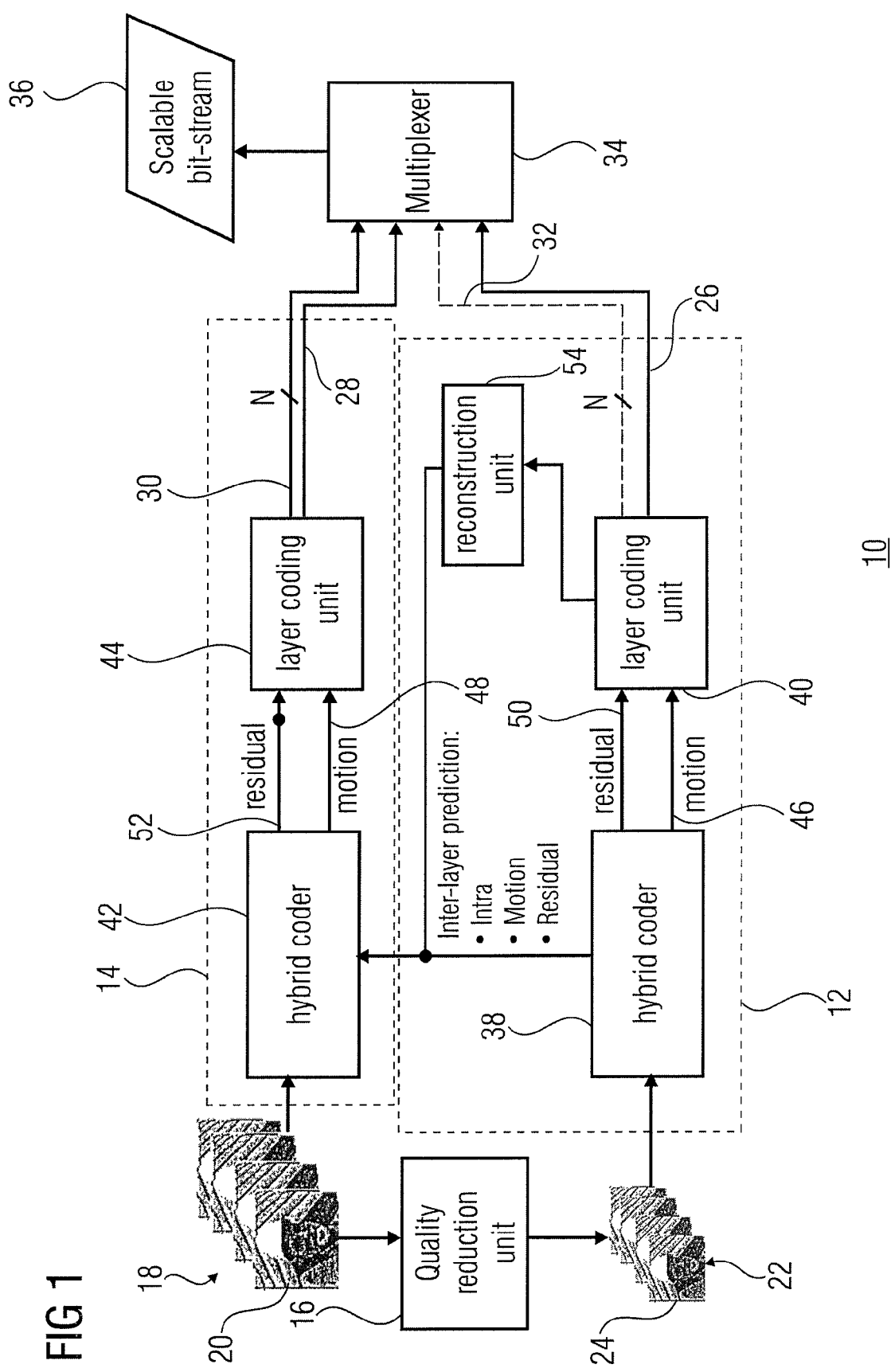
FIG. 1 shows a block diagram of an encoder generating a quality-scalable video data stream according to an embodiment.

FIG. 1 shows an encoder for generating a quality-scalable bit-stream. Exemplarily, the encoder 10 of FIG. 1 is dedicated for generating a scalable bit-stream supporting two different spatial layers and N+1 SNR layers. To this end, the encoder 10 is structured into a base layer part 12 and a spatial enhancement layer part 14. A quality reduction unit 16 of encoder 10 receives the original or higher quality video 18 representing a sequence of pictures 20 and reduces its quality—in the sense of spatial resolution in the example of FIG. 1—to obtain a lower quality version 22 of the original video 18 consisting of a sequence of pictures 24, the lower quality version 22 being input into the base layer part 12.

The quality reduction unit 16 performs, for example, a sub-sampling of the pictures by a sub-sampling factor of 2, for example. However, it is to be understood that although FIG. 1 shows an example supporting two spatial layers 12, 14, the embodiment of FIG. 1 may readily be applied to applications where the quality reduction performed between the original video 18 and the lower quality video 22 does not comprise a sub-sampling, but for example, a reduction in the bit-depth of the representation of the pixel values, or the quality reduction unit simply copies the input signal to the output signal.

While the base layer part 12 receives the lower quality video 22, the original video 18 is input into the higher quality part 14, with both parts 12, 14 performing a hybrid coding on the video respectively input. The base layer part 12 receives the lower quality video 22 and generates a base layer bit-stream 26. On the other hand, the higher quality layer part 14 receives at its input the original video 18 and generates, besides a spatial enhancement layer bit-stream 28, N SNR refinement layer bit-streams 30. The generation and the inter-relationship between bit-streams 28 and 26 will be described in more detail below. As a precautionary measure only, it is noted that the base layer part 12 could also accompany the base layer bit-stream 26 by several SNR refinement layers 32. However, in order to ease the illustration of the principles of the present embodiment, it is assumed that SNR scalability is restricted to the enhancement layer part 14. However, the following discussion will reveal that the functionality described below with respect to the higher quality layer part 14 with regard to the SNR refinement layers is readily transferable to the base layer part 12. This is indicated in FIG. 1 by a dotted line 32.

All bit-streams 26 to 32, are input into a multiplexer 34 which generates a scalable bit-stream 36 from the data streams at its input, eventually arranged in packets, as will be described in more detail below.

Internally, base layer part 12 comprises a hybrid coder 38 and a layer coding unit 40 connected in series, in the order mentioned, between the input to which the low quality video 24 is applied, on the one hand and the multiplexer 34, on the other hand. Similarly, the higher quality layer part 14 comprises a hybrid coder 42 and a layer coding unit 44 connected between the input to which the original video 18 is applied and the multiplexer 44. Each hybrid coder 42 and 38 respectively, codes its video input signal by hybrid coding, i.e. motion compensated prediction is used along with block-wise transformation of the prediction residual. Thus, each hybrid coder 38 and 42, respectively, outputs motion information data 46 and 48, respectively, as well as residual data 50 and 52, respectively, into the input of the subsequent layer coding unit 40 and 44, respectively.

Naturally, redundancy exists between the motion data 46 on the one hand and 48 on the other hand, as well as the residual data 50 and 52. This inter-layer redundancy is exploited by hybrid coder 42. In particular, on a macroblock basis, the hybrid coder 42 can choose between several inter-layer prediction options. For example, the hybrid coder 42 can decide to use or adopt the base layer motion data 46 as the motion data 48 for the higher quality layer. Alternatively, the hybrid coder 42 may decide to use the base layer motion data 46 as predictor for the motion data 48. As a further alternative, the hybrid coder 42 may code the motion data 48 completely anew, i.e. independent from the base layer motion data.

Similarly, the hybrid coder 42 may code the residual data 42 for the higher quality layer predictively as the prediction residual relative to the base layer residual data 50 as a predictor.

However, the hybrid coder 42 may also use a reconstruction of the picture content of the base layer as a predictor for the picture content of the original video data so that in this case motion data and/or residual data 48 and 52, respectively, merely code the residual relative to the reconstructed base layer data. As will be described with respect to FIG. 2, the reconstructed base layer picture information may be received by the base layer hybrid coder 38 or a dedicated reconstruction unit 54 coupled between the base-layer coding unit 40 and a higher quality layer hybrid coder 42.

In the following, an internal structure and the functionality of the hybrid coders 38 and 42 as well as the layer coding unit 44 will be described in more detail. With regard to layer coding unit 40, in the following it is assumed that same merely generates base layer data-stream 26. However, as indicated above, an alternative of an embodiment according to which the layer coding unit 40 also generates SNR refinement layer data-streams 32 is readily derivable from the following description with respect to the layer coding unit 44.

Figure 3:
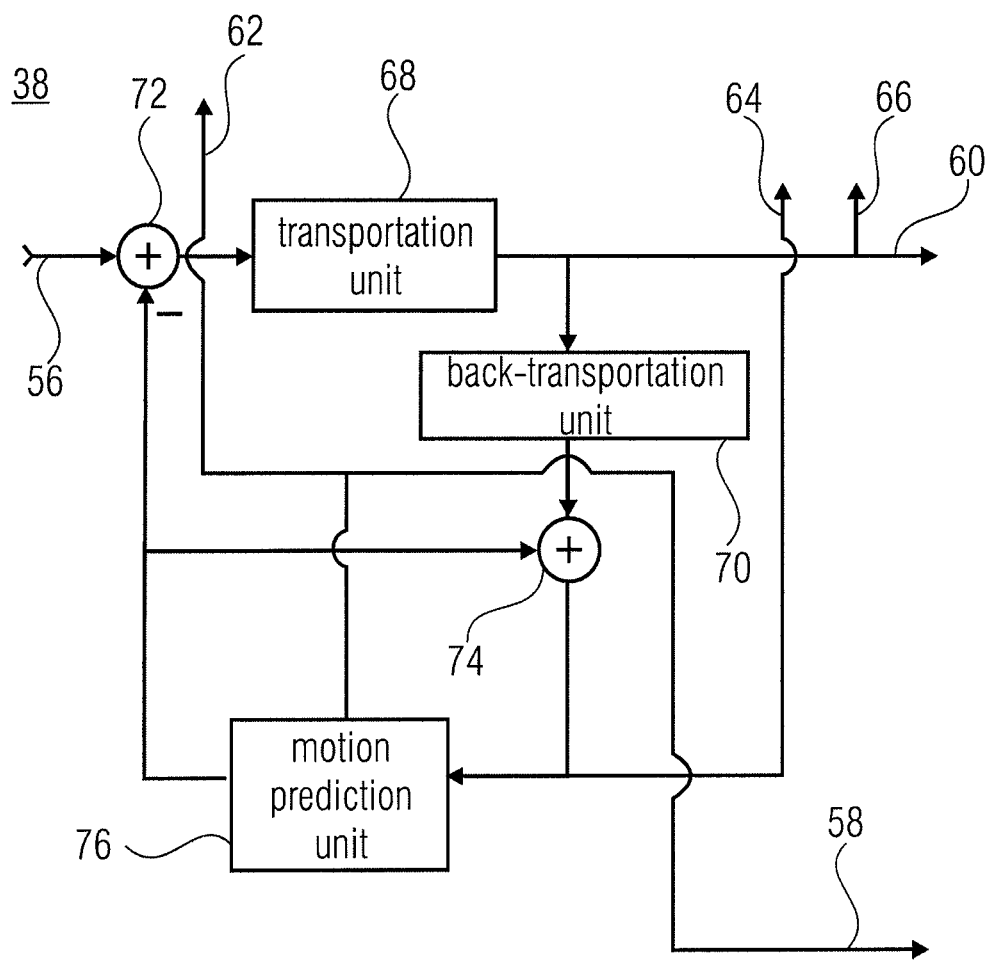
FIG. 3 shows a block diagram of a base-layer hybrid coder of FIG. 1 according to an embodiment.

Firstly, the internal structure and functionality of the base layer hybrid coder 38 is described. As shown in FIG. 3, the base layer hybrid coder 38 comprises an input 56 for receiving the lower quality video signals 24, an output 58 for the motion data 46, an output 60 for the residual data 50, an output 62 for coupling the motion data 58 to hybrid coder 42, an output 64 for coupling reconstructed base layer picture data to hybrid coder 42, and an output 66 for coupling residual data 50 to hybrid coder 42.

Figure 2:
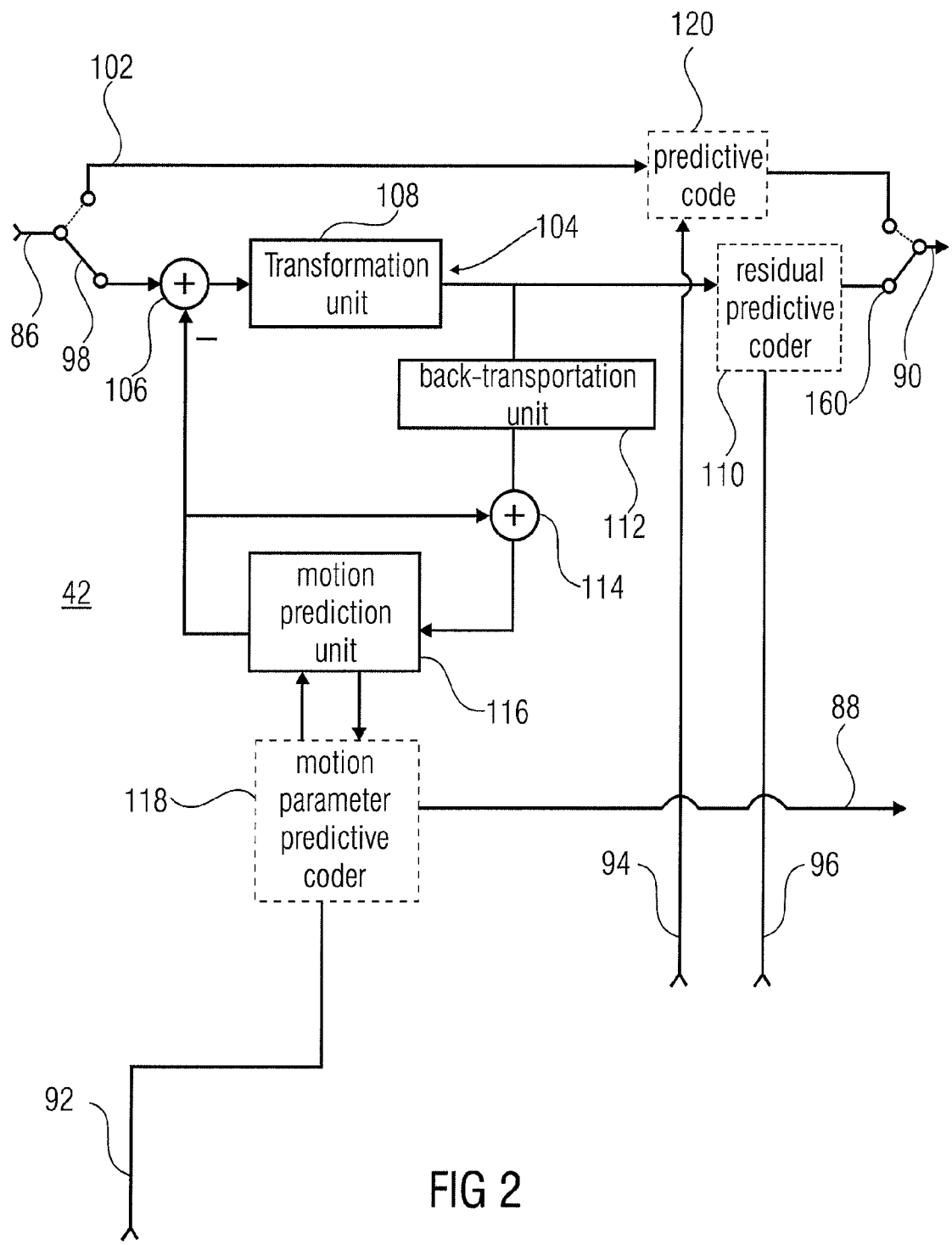
FIG. 2 shows a block diagram of a higher-layer hybrid coder of FIG. 1 according to an embodiment.

Internally, hybrid coder 38 comprises a transformation unit 68, a back-transformation unit 70, a subtractor 72, an adder 74, and a motion prediction unit 76. The subtractor 72 and the transformation unit 68 are coupled, in the order mentioned, between the input 56 and the output 60. The subtractor 72 subtracts from the input video signal motion-predicted video content received from the motion prediction unit 76 and forwards the difference signal to transformation unit 68. The transformation unit 68 performs a block-wise transformation on the difference/residual signal along with, optionally, a quantization of the transform coefficients. The transformation result is output by the transformation unit 68 to output 60 as well as an input of back-transformation unit 70. The back-transformation unit 70 performs an inverse transformation on the transform blocks of transformation coefficients with, eventually, a preceding dequantization. The result is a reconstructed residual signal which is, by adder 74, additively combined with the motion-predicted video content output by motion prediction unit 76. The result of the addition performed by adder 74 is a reconstructed video in base quality. The output of adder 74 is coupled to an input of motion prediction unit 76 as well as output 64. The motion prediction unit 76 performs a motion-compensated prediction based on the reconstructed pictures in order to predict other pictures of the video input to input 56. The motion prediction unit 76 produces, while performing motion-prediction, motion data including, for example, motion vectors and motion picture reference indices and outputs this mode motion data to output 62 as well as output 58. The output of the transformation unit 68 is also coupled to the output 66 in order to forward the transform residual data to the hybrid coder 42 of the higher quality layer. As already mentioned above, the functionality of both hybrid coders 38 and 42 of FIG. 1 is similar to each other. However, the hybrid coder 42 of the higher quality layer also uses inter layer prediction. Thus, the structure of the hybrid coder 42 shown in FIG. 2 is similar to the structure of hybrid coder 38 shown in FIG. 3. In particular, the hybrid coder 42 comprises an input 86 for the original video signal 18, an output 88 for the motion data 48, an output 90 for the residual data 52, and three inputs 92, 94 and 96 for being coupled with the respective outputs 62, 64 and 66 of base layer hybrid coder 38. Internally, hybrid coder 42 comprises two switches or selectors 98 and 100 for connecting one of two paths 102 and 104 between input 86 and output 90. In particular, path 104 comprises a subtractor 106, a transformation unit 108 and a residual predictive coder 110 being connected, in the order mentioned, between input 86 and output 90 via switches 98 and 100. Subractor 106 and transformation unit 108 form, along with a back-transformation unit 112, an adder 114 and a motion prediction unit 116, a prediction loop such as that formed by elements 68 to 76 in hybrid coder 38 of FIG. 3. Accordingly, at the output of the transformation unit 108 a transformed version of the motion-predicted residual results which is input into residual predictive coder 110. The residual predictive coder 110 is also connected to the input 96 in order to receive the base layer residual data. By use of this base layer residual data as a predictor, the residual predictive coder 110 codes a part of the residual data output by transformation unit 108 as a prediction residual relative to the residual data at input 96. For example, the residual predictive coder 110 up-samples the base layer residual data and subtracts the upsampled residual data from the residual data output by transformation unit 108. Of course, the residual predictor coder 110 may perform the prediction only for a part of the residual data output by transformation unit 108. Other paths pass residual predictive coder 110 unchanged. The granularity of these parts may be macro blocks. In other words, the decision as to whether the residual data at input 96 may be used as a predictor or not may be conducted on a macroblock basis and the result of the decision may be indicated by a respective syntax element residual_prediction_flag.

Similarly, the hybrid coder 42 comprises a motion parameter predictive coder 118 in order to receive the motion data at input 92 from the base layer as well as the motion information obtained from motion prediction unit 116 and switches, on a macroblock basis, between passing the motion data from motion prediction unit 116 unchanged to output 88, or predictively coding the motion data by use of the motion information from the base layer at input 92 as a predictor. For example, motion parameter predictive coder 118 may code motion vectors from motion prediction unit 116 as offset vectors relative to motion vectors contained in the base layer motion data at input 92. Alternatively, motion parameter predictive coder 118 passes the base layer information from input 92 to motion prediction unit 116 to be used for the motion prediction in the higher quality layer. In this case, no motion data has to be transmitted for the respective portion of the higher quality layer video signal. As a further alternative, the motion parameter predictive coder 118 ignores the existence of the motion data at input 92 and codes the motion data from the motion prediction unit 116 directly to output 88. The decision among these possibilities is coded into the resulting quality scalability bit-stream.

Finally, the predictive coder 120 is provided in path 102 and coupled with input 94. Predictive coder 120 predicts portions of the higher quality layer based on respective portions of the reconstructed base layer video signal so that at the output of predictive coder 120 merely the respective residual or difference is forwarded. Predictive coder 120 does also operate on a macroblock-wise basis in cooperation with switches 98 and 100.

Figure 4:
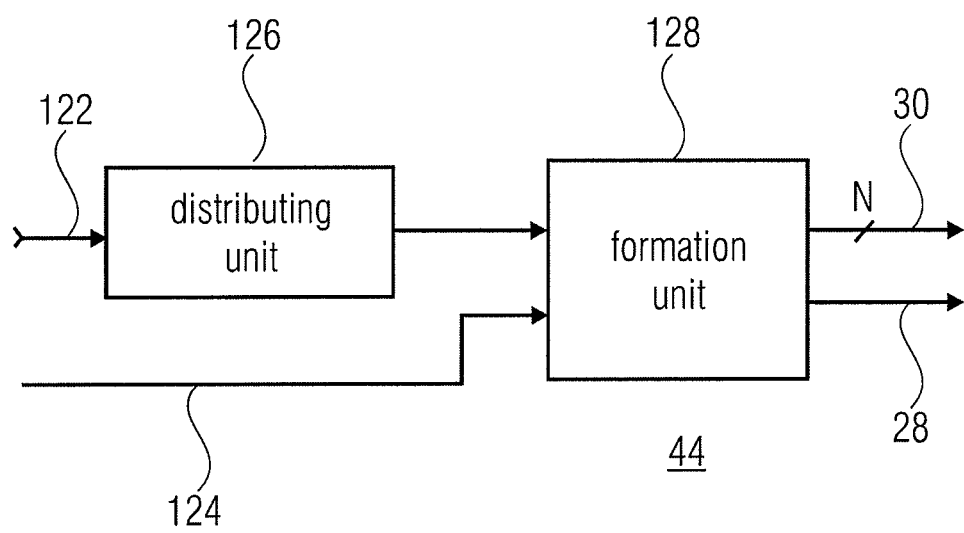
FIG. 4 shows a block diagram of a layer coding unit of the higher quality layer of FIG. 1 according to an embodiment.

As may be seen from FIG. 4, the layer coding unit 44 of the higher quality layer comprises an input 122 for receiving the transform coefficients of residual data from output 90 and an input 124 for receiving the motion data from output 88. A distributing unit 126 receives the transformation coefficients and distributes them to several enhancement layers. The transformation coefficients thus distributed are output to a formation unit 128. Along with the distributed transformation coefficients, the formation unit 128 receives the motion data from input 124. The formation unit 128 combines both data and forms, based on these data inputs, the zero-order enhancement layer data stream 28 as well as refinement-layer data streams 30.

Figure 5:
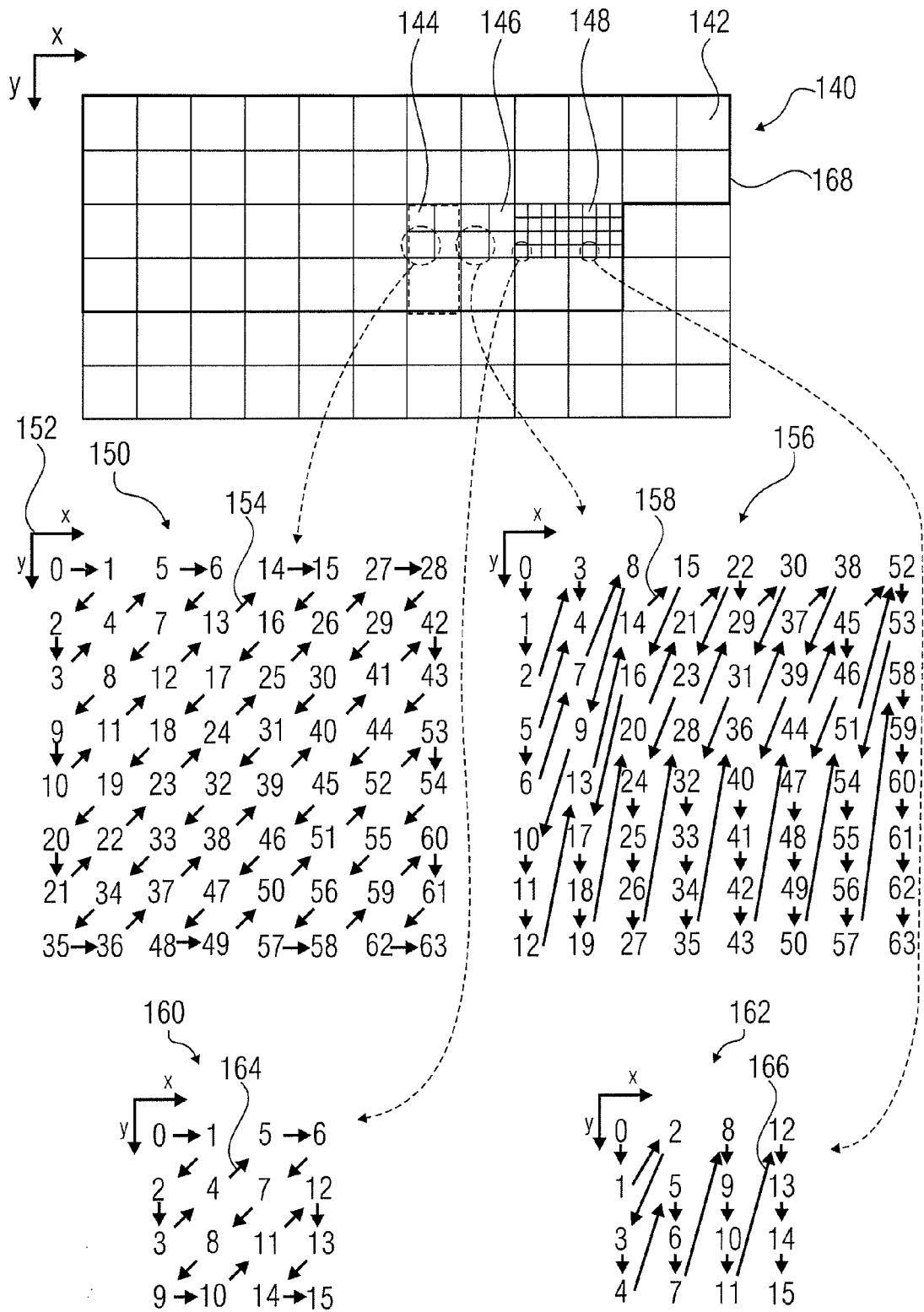
FIG. 5 shows a schematic diagram illustrating the structure of a picture as well as its bock-wise transformation according to an embodiment.

In order to enable a more detailed description of the functionality of the distributing unit 126 and the formation unit 128, in the following the block-basis underlying the transformation performed by the transformation unit 108 and its interrelationship to the distribution performed by the distributing unit 126 will be described in more detail with respect to FIG. 5. FIG. 5 represents a picture 140. Picture 140 is, for example, part of the high quality video data 18 (FIG. 1). Within picture 140, the pixels are, for example, arranged in lines and columns. The picture 140 is, for example, partitioned into macroblocks 142, which may also be arranged regularly in lines and columns. Each macroblock 142 may, for example, spatially cover a rectangular picture area in order to comprise, for example, 16×16 samples of, for example, the luma component of the picture. To be even more precise, the macroblocks 142 may be organized in pairs of macroblocks. In particular, the vertically adjacent pair of macroblocks 142 may form such a pair of macroblocks and may assume, spatially, a macroblock pair region 144 of picture 140. On a macroblock pair basis, hybrid coder 42 (FIG. 1) may handle the macroblocks 142 within the respective region 144 in field-mode or frame-mode. In case of field-mode, the video 18 is assumed to contain two interleaved fields, a top and a bottom field, where the top field contains the even numbered rows of pixels, and the bottom field contains the odd numbered rows starting with the second line of the picture 140. In this case, the top macroblock of region 144, relates to the pixel values of the top field lines within region 144 whereas the bottom macroblock of region 144 relates to the content of the remaining lines. Thus, in this case, both macroblocks spatially assume substantially the whole area of region 144 with a reduced vertically resolution. In case of frame-mode, the top macroblock is defined to spatially encompass the upper half of the rows within region 144 whereas the bottom macroblock comprises the remaining picture samples in region 144.

As already noted above, the transformation unit 108 performs a block-wise transformation of the residual signal output by subtractor 106. In this regard, the block basis for the transformation within transformation unit 108 may differ from the macroblock size of the macroblocks 142. In particular, each of the macroblocks 142 may be partitioned into four, i.e. 2×2, transform blocks 146 or 16, i.e. 4×4, transform blocks 148. Using the above-mentioned example for the macroblock size of 16×16 picture samples, the transformation unit 108 would transform the macroblocks 142 of picture 140 block-wise in blocks of size of 4×4 pixel samples or 8×8 pixel samples. Thus, the transformation unit 108 outputs, for a certain macroblock 142, several transform blocks 146 and 148 respectively, namely 16 4×4 transform coefficient blocks or 4 8×8 transform coefficient blocks 146.

At 150 in FIG. 5, an instance of an 8×8 transform coefficient block of a frame-coded macroblock is illustrated. In particular, at 150, each transform coefficient is assigned to and represented by a scan position number, these numbers ranging from 0 to 63. As illustrated by the axes 152, the respective transformation coefficients are associated with a different spatial frequency component. In particular, the frequency associated with a respective one of the transform coefficients increases in magnitude from an upper left corner to the bottom right hand corner of the transform block 150. The scan order defined by the scan positions among the transform coefficients of transform block 150, scans the transform coefficients from the upper left hand corner in a zig-zag manner to the lower right-hand corner, this zig-zag scan being illustrated by arrows 154.

For sake of completeness only, it is noted that the scan among the transform coefficients may be differently defined among the transform coefficients of a transform block of a field-coded macroblock. For example, as it is shown at 156 in FIG. 5 in case of a field-coded macroblock, the transform coefficient scan 158 scans the transform coefficients from the upper left-hand corner to the lower right-hand corner in a zig-zag manner with a reciprocating or zig-zag direction which is steeper than the 45° zig-zag direction used in case of the frame-coded macroblock at 150. In particular, a coefficient scan 158 scans the transform coefficients in column direction twice as fast than in line direction in order to take into account the fact that field-coded macroblocks encompass picture samples having a column pitch twice the horizontal or line pitch. Thus, as it is the case with the coefficient scan 154, coefficient scan 158 scans the transform coefficients in a way so that the frequency increases as the position scan number increases.

At 150 and 158, examples for coefficient scans of 8×8 transform coefficient blocks are shown. However, as already noted above, transform blocks of smaller size, i.e. 4×4 transform coefficients may also exist. For these cases, respective position scans are shown in FIG. 5 at 160 and 162, respectively, with the scan 164 in case of 160 being dedicated for frame-coded macroblocks, whereas the scan 166 illustrated at 162 is dedicated for field-coded macroblocks.

It is to be emphasized, that the specific examples shown in FIG. 5 with respect to the sizes and arrangements of the macroblocks and transform blocks are of illustrative nature only, and that different variations are readily applicable. Before starting with the description of the subsequent figures, it is noted that the picture 140 may be subdivisioned, on a macroblock basis, into several slices 168. One such slice 168 is exemplarily shown in FIG. 5. A slice 168 is a sequence of macroblocks 142. The picture 140 may be split into one or several slices 168.

After having described the subdivision of a picture into macroblock pair regions, macroblocks and transform blocks as well as slices, respectively, the functionality of the distributing unit 126 and the formation unit 128 is described in the following in more detail. As may be seen from FIG. 5, the scan order defined among the transform coefficients enables the two-dimensionally arranged transform coefficients to be ordered into a linear sequence of transform coefficients with monotonously increasing frequency contents to which they refer. The distributing unit 126 operates to distribute the transform coefficient of several macroblocks 142 to different quality layers, i.e. any of the zero order layer associated with a data stream 28 and the refinement layers 30. In particular, the distributing layer 126 tries to distribute the transform coefficients to the data streams 28 and 30 in such a way, that with increasing number of contributing layers from the zero or the layer 28 to the highest quality refinement layer 30, the SNR quality of the video reconstructable from the respective data streams increases. In general, this will lead to a distribution where the lower frequency transform coefficients corresponding to lower scan positions are distributed to lower quality layers whereas higher frequency transform coefficients are distributed to higher quality layers. On the other hand, distributing unit 126 will tend to distribute transform coefficients with higher transform coefficient values to lower quality layers and transform coefficients with lower transform coefficient values or energies to higher quality layers. The distribution formed by distributing unit 126 may be performed in such a way that each of the transform coefficients is distributed to one single layer. However, it is also possible that the distribution performed by the distributing unit 126 is performed in such a way that the amount of a transform coefficient may also be distributed to different quality layers in parts such that the distributed parts sum up to the transform coefficient value. Details of the different possibilities for the distribution performed by distributing unit 126 will be described in the following with respect to FIG. 6a-g. The formation unit 128 uses the distribution resulting from distributing unit 126 in order to form respective sub-data streams 28 and 30. As already noted above, sub-data stream 28 forms the lowest quality layer refinement sub-data stream and contains, for example, the motion data input at input 124. This zero-order sub-data stream 128 may also be provided with a first distributed portion of the transform coefficient values. Thus, sub-data stream 28 allows for a refinement of the base-quality layer data stream 26 to a higher quality—in the instance of FIG. 1 to a higher spatial quality—but a further SNR quality enhancement may be obtained by accompanying the sub-data stream 28 with any of the further higher quality refinement sub-data streams 30. The number of these refinement quality sub-data streams 30 is N, where N may be one or more than one. The transform coefficients are thereby—for example, in the order of increasing importance for the SNR quality—"distributed" to these sub-data streams 28 and 30.

FIG. 6a shows an example for a distribution of the first 26 transform coefficient values of an 8×8 transform block. In particular, FIG. 6a shows a table where the first line of the table lists the respective scan positions according to the scan order 154 and 158, respectively (FIG. 5). It can be seen that the scan positions shown extend, exemplarily from 0 to 25. The following three lines show the corresponding contribution values incorporated into the respective sub-data streams 28 and 30, respectively, for the individual transform coefficient values. In particular, the second line corresponds to, for example, the zero order sub-data stream 28 whereas the penultimate line belongs to the next higher refinement layer 30 and the last line refers to the even next quality layer refinement data-stream. According to the example of FIG. 6a, a "122" is coded into the sub-data streams 128 for the DC component, i.e. transform coefficient value belonging to scan position 0. The contribution values for this transform coefficient having scan position 0 within the following two sub-data streams 30, are set to zero as indicated by the hashing of the respective table entries. In this way, according to the example of FIG. 6a, the zero order enhancement layer sub-data stream 28 comprises a distribution value for each of the transform coefficient values. However, within the transform block of FIG. 6a, merely the transform coefficient values of scan positions 0 to 6, 8 and 9 belong to the zero order quality layers. Further transform coefficient values are set to zero. It is to be emphasized, that in other transform blocks, the transform coefficient values belonging to the zero order quality layer may belong to other scan positions. Similarly, the transform coefficient values of scan positions 7, 10 to 12, 15 to 18 and 21 belong to the next higher quality layer. The remaining transform coefficient values are set to zero. The remaining coefficient values of the remaining scan positions are included in the next higher quality layer sub-data stream. As can be seen, it may be possible that a certain transform coefficient value is actually zero. In the example of FIG. 6a, this is the case for scanning position 23. The corresponding contribution values within the preceding quality layers are set to zero and the transform coefficient value for the scan position 23 in the last quality layer (last line) for scan position 23 is zero itself.

Thus, for each of the scan positions, the contribution values included in the various quality layers sub-bit streams 28 and 30, sum up to the actual transform coefficient value so that, at decoder side, the actual transform block may be reconstructed by summing up the contribution values for the individual scan positions of the different quality layers.

According to the embodiment of FIG. 6a, each of the sub-data streams 28 and 30 comprises a contribution value for all the transform coefficients and for all the scan positions, respectively. However, this is not necessarily the case. Firstly, as already mentioned above, it is not necessary that the zero order sub-data stream 28 contains any transform coefficient or contribution value. So in the latter case, the last three lines of the table of FIG. 6a could be seen as belonging to the first refinement layer sub-data streams 30 with the zero order sub-data stream 28 merely comprising the motion information from input 124.

Moreover, it is noted that the FIG. 6a contribution values having been set to zero and actual transform coefficient values actually being zero have been distinguished by use of hashed table entries merely for sake of an easier understanding of the functionality of information unit 128. However, the sub-data streams 28 and 30 may be construed such that the just-mentioned distinction between contribution values having been set to zero and contribution values naturally being zero is transparent for the decoder. To be more precise, some of the respective contribution values for respective scan positions, i.e. the numbers from the second to the fourth line below a respective scan position in the first line of FIG. 6a reveals the transform coefficient value independent from individual contribution values in the sum being set to zero or naturally being zero.

Figures 6B, 6F:
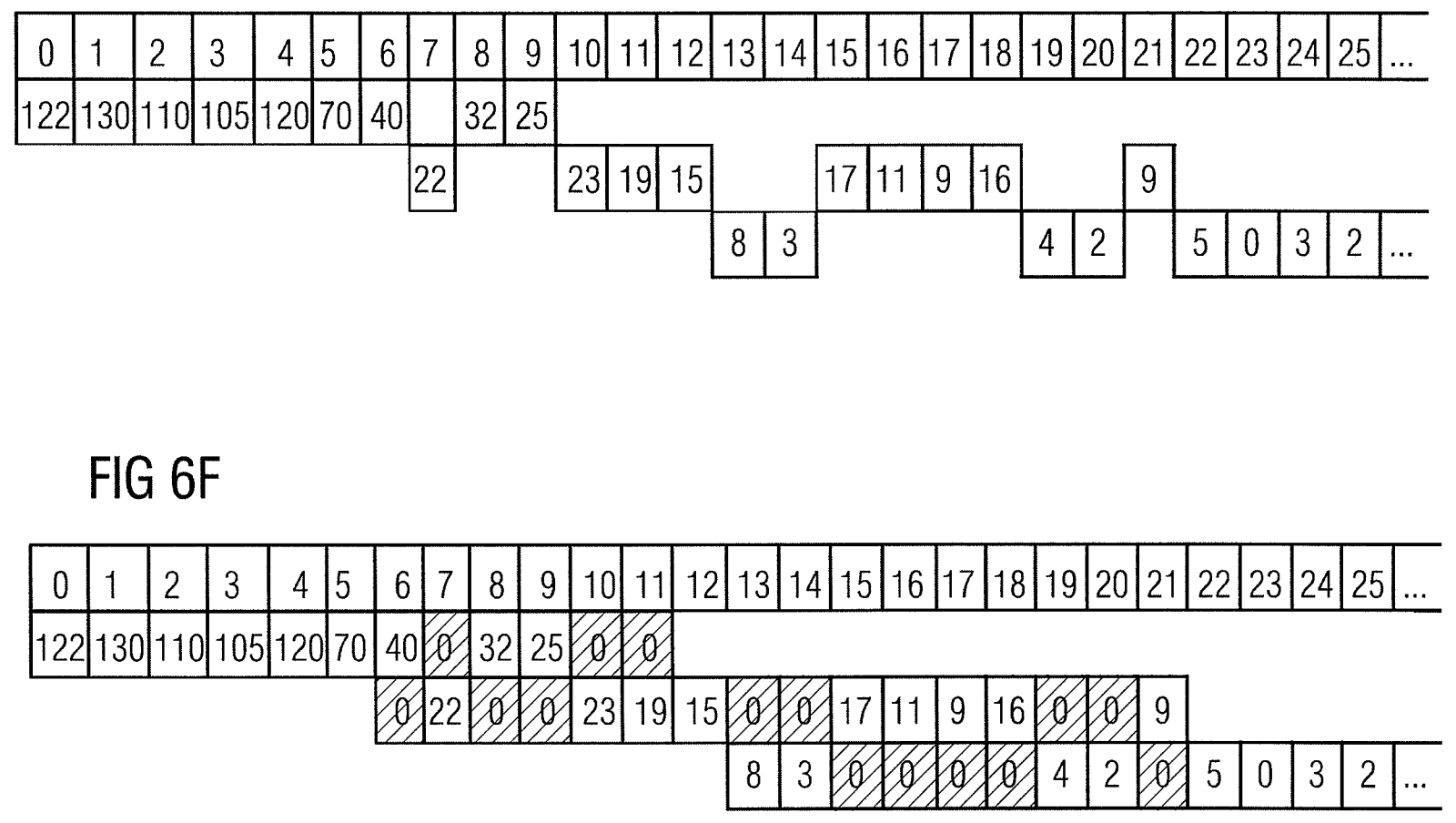

In the embodiment of FIG. 6a, the formation unit 128 coded into a respective one of the sub-data stream 28 and 30 respectively, a contribution value for each of the scan positions. This is not necessary. According to the embodiment of FIG. 6b, for example, the consecutive quality layer sub-data streams comprise merely those transform coefficient values belonging to the respective quality layer.

The order, in which the contribution values and transform coefficient values are coded into the sub-data streams 28 and 30 respectively, may vary in the embodiments of FIG. 6a and FIG. 6b, respectively. For example, the sub-data streams 28 and 30 may be packetized data streams where each packet corresponds to one slice 168. Within one slice 168, the transform coefficient values may be coded into the respective packets macroblock-wise. That is, a scan order may be defined among the macroblocks 142 within a slice 168 with the transform coefficient values for a predetermined macroblock 142 being completely coded into the respective packet before the first transform coefficient value of a macroblock following a macroblock scan order. Within each macroblock, a scan order may be defined among the respective transform blocks 146 and 148, respectively, within the respective macroblock. Again, the transform coefficient values may be coded into a respective one of the sub-data streams 28 and 30, respectively by formation unit 128 such that the transform coefficient values of a respective one of the transform blocks are all coded into the respective sub-data stream before the first transform coefficient value of a next transform block is coded into the same. Within each transform block, a coding of the transform coefficient values and contribution values, respectively, may be conducted in a way explained in the following with respect to FIG. 8 or 9.

According to the embodiments of FIGS. 6a and 6b, the transform coefficient values of the different transform blocks of the slice 168 belonging to a respective one of the quality layers, extended over a different portion of the scan order. To be more precise, although in the specific transform block exemplarily shown in FIGS. 6a and 6b, scan positions 0 to 6, 8 and 9 belong to the zero order quality layer, in another transform block, the set of scan positions belonging to this layer may be different. According to the embodiment of FIG. 6c, however, the distributing unit 126 distributes the transform coefficient values of the different transform blocks within a slice 168 such that for all transform blocks, the transform coefficient values of the same set of scan positions belongs to the same quality layer. For example, in FIG. 6c the transform coefficient values of the scan positions from 0 to 11 belong to the zero order sub-data stream 28 with this being true for all transform blocks within slice 168.

According to the embodiment of FIG. 6c, in addition, the transform coefficient values belonging to a specific one of the quality layers extend over a continuous sequence of consecutive scan positions. This, however, needs not to be the case. In particular, transform coefficient values belonging to a scan position between the first and the last scan position belonging to a specific quality layer may belong to one of the other quality layers such as shown in FIG. 6b. However, in case of the embodiment of FIG. 6c it is possible to indicate the scan positions incorporated into any one of the quality layer sub-data streams 28 and 30, respectively, by use of merely two syntax elements, one indicating the first scan position of the respective quality layer, i.e. scan_idx_start and the other indicating the last scan position for the respective quality layer, i.e. scan_idx_end.

The reservation of a specific set of scan positions to a respective one of the quality layers on the one hand and the quality-importance dependent distribution of the transform coefficients to the individual quality layers on the other hand, may be mixed up as shown in the following embodiment. For example, FIG. 6d shows an embodiment where the distributing unit 126 has distributed the transform coefficients over the quality layers as it was shown with respect to FIG. 6a. This distribution differs from transform block to transform block. However, on the other hand, each of the quality layers is assigned a specific portion of the scan positions in common for all transform blocks. For example, the lowest quality layer is assigned the full set of scan positions from scan position 0 to scan position 63. Thus, for each transform block, the lowest quality layer comprises 64 contribution values. The next higher quality layer sub-data stream comprises contribution or transform coefficient values for all transform blocks in a specific scan position range which extends from scan position 6 to 63. The scan position range of the next quality layer extends from scan position 13 to 63. Again, the decoder does not need to know as to whether a specific one of the contribution values is a contribution value that has been set to 0 (hashed entry) or is actually indicating a 0 transform coefficient value or insignificant transform coefficient value. However, he needs to know the syntax element scan_idx_start that indicates for the respective slice 168 from which scan position on the transform coefficient or contribution values contained in the respective sub-data stream are to be used for. To be more precise, in the embodiment of FIG. 6d, for example, the sub-data stream corresponding to the penultimate line comprises, for an individual transform block 58, transform coefficient or contribution values. The first one, in case of the transform block of FIG. 6d, is 0, while the second one is 22. By use of the syntax element scan_idx_start at a decoder side, it is known that the first transform coefficient value of the respective quality layer corresponds to scan position 6, while the remaining transform coefficient values of this quality layer refer to the following scan positions. Similar to the embodiments of FIG. 6d, FIG. 6e shows an embodiment where a syntax element scan_idx_end indicates for the individual sub-data streams the last scan position up to which the respective quality layer sub-data stream comprises sub-coefficients or contribution values.

A combination of the embodiments of FIGS. 6d and 6e is shown in FIG. 6f. According to this embodiment, the respective set of scan positions belonging to a specific one of the quality layers extends from a first scan position indicated by a syntax element scan_idx_start to a last scan position indicated by the syntax element last_idx_end. For example, in the quality layer corresponding to the penultimate line, the respective set of scan position extends from scan position 6 to scan position 21. Finally, the embodiment of FIG. 6g shows that the use of the syntax element scan_idx_start and/or scan_idx_end may be combined with the focus of the embodiment of FIG. 6c according to which the distribution of the individual transformation coefficient values of the different transform block within a slice 168 is common for the transform blocks. Accordingly, according to the embodiment of FIG. 6g, within a specific one of the quality layers, all transform coefficient values within scan_idx_start to scan_idx_end are distributed to the respective quality layer. Therefore, differing from the embodiment of FIG. 6f, in the embodiment of FIG. 6g, all the transfer coefficient values within scan position 6 to scan position 21 are assigned to the quality layer corresponding to the penultimate line in FIG. 6g. Differing therefrom, in the embodiment of FIG. 6f, several ones of the contribution values within this position scan range from 6 to 21 may be set to 0 wherein the distribution of transform coefficient values having been set to 0 and transform coefficient values having not been set to 0 within this position scan range from 6 to 21, may be different than any one of the other transform blocks within the current slice.

In the following, the cooperation between hybrid coder 42, layer coding unit 44, distributing unit 126 and formation unit 128 is described illustratively with respect to FIG. 7 which shows an example for the structure of the sub-data streams 28 and 30, respectively. According to the embodiment of FIG. 7, the formation unit 28 is designed such that the individual sub-data streams 28 and 30, respectively, are packetized, i.e. they comprise one or more packets. In particular, the formation unit 128 may be designed to generate a packet for each slice 168 within a picture 140 within each sub-bit stream 28 and 30, respectively. As is shown in FIG. 7, a packet may comprise a slice header 170 on the one hand and residual data 172 on the other hand, except sub-bit stream 28 which optionally comprises merely the slice header within each one of the packets.

With respect to the description of the residual data 172, i.e. residual data #1, residual data #2, . . . , residual data #N, reference is made to the above description with respect to FIGS. 6a to 6g, where for example, the second to fourth lines in these tables correspond to residual data #1, residual data #2 and residual data #3, for example. In even other words, residual data 172 indicated in FIG. 7 includes the transform coefficient values discussed in FIGS. 6a to 6g, the distribution of which among the respective sub-data streams 28 and 30 is not again described here. However, FIG. 7 shows further syntax elements contained in the slice header 170 and the residual data 172 which stem from hybrid coder 42. As described above, the hybrid coder 42 switches, on a macroblock basis between several inter-layer prediction modes so as to rely on the motion information from the base layer, or generate new motion information for a respective motion block of the higher refinement layer with predictively coding the motion information as a residual to the motion information from the base layer, or with coding this motion information anew. Thus, as indicated in FIG. 7, the residual data 172 may comprise, for each macroblock, syntax elements indicating motion parameters, macroblock modes such as field or frame coded, or an inferring mode indicating the reuse of the motion parameters of the base layer with the respective macroblock. This is especially true for the zero or the sub-data stream 28. However, this motion information is not again refined in the following refinement layers and the following higher qualities sub-data streams $30_1$ to $30_N$, and therefore, the formation unit 128 is designed to leave these macroblock-wise syntax elements concerning macroblock modes, motion parameters and inferring mode indication in the residual data of these sub-data streams $30_1$ to $30_N$ away or to set the syntax elements in these sub-data streams $30_1$ to $30_N$ to be either equal to the macroblock modes and motion parameters for the respective macroblock contained in sub-data stream 28 or indicate the inferring mode for the respective macroblock in order to indicate that the same settings are to be used in the respective refinement layer. According to the embodiment of the present invention, all the residual data 172 within the various sub-data streams 28 and $30_1$ to $30_N$ are passed using the same syntax structure so that also the residual data within the refinement sub-data streams $30_1$ to $30_N$ comprise macroblock-wise defined information on macroblock mode, motion parameter and/or inferring mode activation/deactivation.

Figure 7:
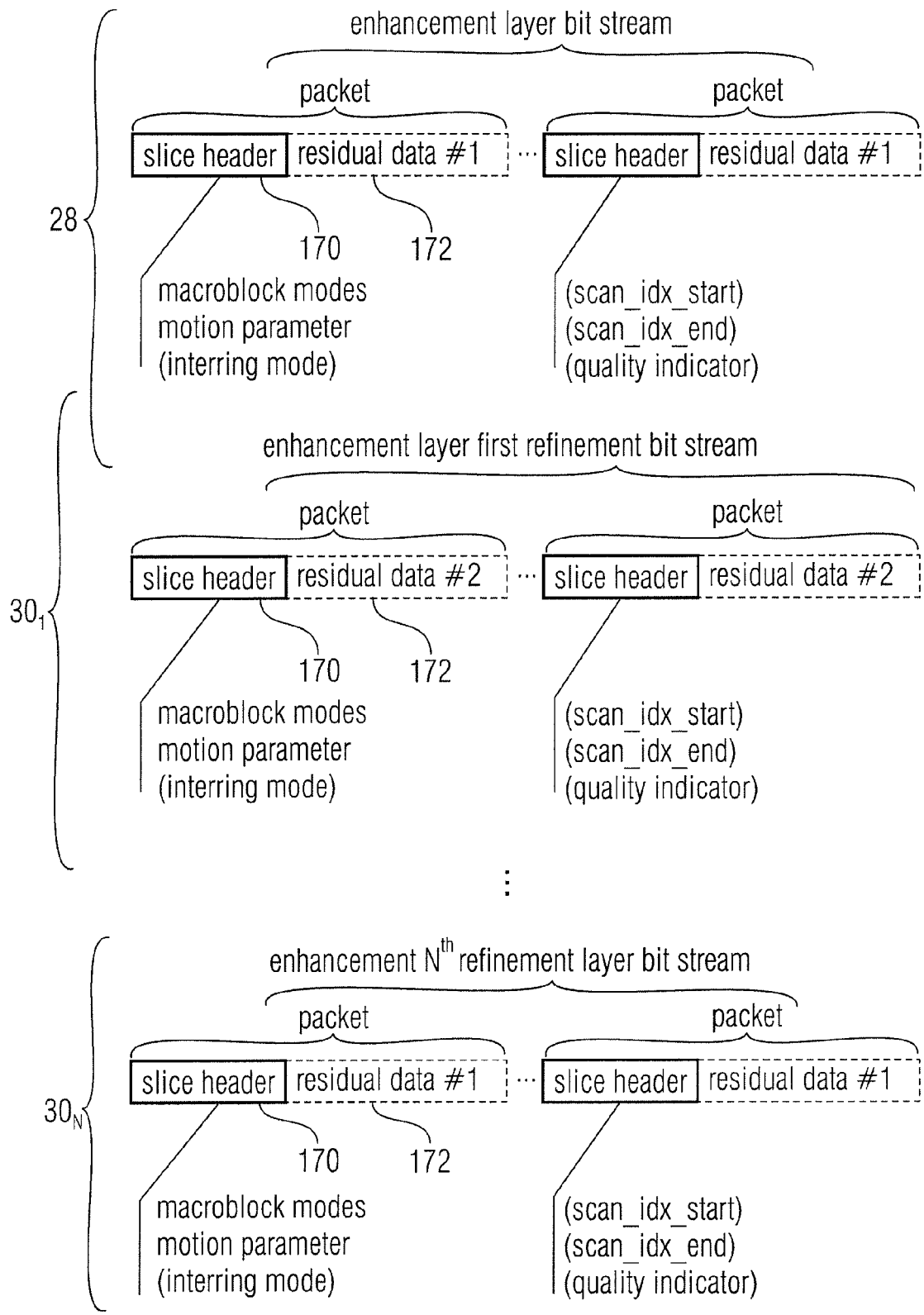
FIG. 7 shows a schematic diagram illustrating the construction of sub-data streams according to an embodiment.

As also derivable from FIG. 7, the formation unit 128 may be designed to provide the slice header 170 with the syntax element scan_idx_start and/or scan_idx_end. Alternatively, the slice header data 170 may comprise other syntax elements defining for each individual slice or packet, a set of scan positions the residual data corresponding to the respective slice header data relate to. As already indicated above, the slice header data of packets of the sub-data stream 28 may not comprise such syntax elements concerning the definition of layer specific scan positions in case the sub-data stream 28 does not comprise any residual data, but merely macroblock modes and/or motion parameters and inferring mode indications, respectively. Further, as already noted above, the slice header data 170 may comprise merely one of scan_idx_start and scan_idx_end. Finally, scan_idx_start and/or scan_idx_end may be provided once per transform block size category, i.e. 4×4 and 8×8, or just once for each slice/picture/sub-data stream commonly for all transform block size categories, with respective measures being taken to transfer scan_idx_start and scan_idx_end to other block sizes as will be described in the following.

Further, the slice header data may comprise a syntax element indicating the quality level. To this end, the formation unit 128 may be designed such that the syntax element or quality indicator merely distinguishes between the zero order quality level 28 on the one hand and the refinement layers $30_1$ to $30_N$ on the other hand. Alternatively, the quality indicator may distinguish all quality layers among the refinement layers 28 and $30_1$ to $30_N$. In the latter two cases, the quality indicator would enable the omission of any macroblock-wise defined macroblock modes, motion parameters and/or inferring modes within the packets of the sub-data streams $30_1$ to $30_N$ since in this case, at the decoder side, it is known that these refinement layers sub-data streams $30_1$ to $30_N$ merely refine the transform coefficients with using the macroblock modes, motion parameters and inferring modes from the zero mode sub-data stream 28.

Although not described in further detail above, the formation unit 28 may be designed to entropy code the packets within the sub-data streams 28 and $30_1$ to $30_N$. Within this embodiment, FIGS. 8 and 9 show possible examples for coding the transform coefficients within the residual data pertaining to one transform block according to two embodiments. FIG. 8 shows a pseudo code of a first example for a possible coding of the transform coefficients within a transform block in any of the residual data 172. Imagine, that the following example applies:

| Scan Position | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|
| Coefficient Number | 0 | 1 | 2 | 3 | 4 | 5 | 6 | 7 | 8 | 9 | 10 | 11 | 12 | 13 | 14 | 15 |
| Transform coefficient level | 7 | 6 | −2 | 0 | −1 | 0 | 0 | 1 | 0 | 0 | 0 | 0 | 0 | 0 | 0 | 0 |

Based on this example, in the following, the pseudo code of FIG. 8 is explained showing the way in which the formation unit 128 may code the residual data within one of the transform blocks into any of the sub-data streams.

In order to convey the information of the transform coefficients, in accordance with FIG. 8, firstly a parameter coeff_token is provided 240. The parameter coeff_token is a code word indicating the number of non-zero coefficients, i.e. total_coeff (coeff_token), and the number of transform coefficients in the run of transform coefficients having an absolute value equal to one at the end of the sequence of non-zero transform coefficients, i.e. trailing_ones (coeff_token). In our example, total_coeff (coeff_token) is 5 (transform coefficient numbers 0, 1, 2, 4 and 7) and trailing_ones (coeff_token) is 2 (transform coefficient number 4 and 7). Thus, by providing the parameter coeff_token 240, the positions of the significant transform coefficients have been determined to the extent that no more than total_coeff (coeff_token) non-zero transform coefficients exist.

Then, the values of the levels of these non-zero transform coefficients are provided. This is done in reverse scan order. To be more specific, firstly it is checked as to whether the total number of non-zero transform coefficients is greater than zero 242. This is the case in the above example, since total_coeff (coeff_token) is 5.

Then, the non-transform coefficients are stepped through in a reverse scan order 244. The reverse scan order is not yet obvious from just viewing the counting parameter incrementation i++ in the for-loop 244 but will become clear from the following evaluation. While stepping through these non-transform coefficients in reverse scan order, for the first of these non-zero transform coefficients, just their transform coefficient sign is provided 248. This is done for the first number of trailing_ones (coeff_token) of the non-zero transform coefficients when stepping through them in a reverse scan order, since for these transform coefficients it is already known that the absolute value of these transform coefficients is one (compare with the above definition of trailing_ones (coeff_token)). The coefficient signs thus provided are used to temporarily store in auxiliary vector coefficients level[i] for the transform coefficient level of the non-zero transform coefficient levels having absolute value of 1 wherein i is a numbering of the non-zero transform coefficients when scanned in reverse scan order (250). In our example, after the first two rounds of the for-loop 244, level[0]=1 and level[1]=−1 is obtained.

Next, the coefficient levels coeff_level for the remaining non-zero transform coefficients are provided (252) in reverse scan order and temporarily stored in the auxiliary vector coefficients level[i] (254). The remaining for-loop rounds result in level[2]=−2, level[3]=6 and level[4]=7.

Now, in order to render the determination of the positions of the significant transform coefficients unique, two further parameters called total_zeros and run_before are provided unless total_coeff (coeff_token) is already equal to the maximum number of transform coefficients in a transform block, i.e. is equal to maxNumCoeff. To be more specific, it is checked as to whether total_coeff (coeff_token) is equal to maxNumCoeff (256). If this is not the case, the parameter total_zeros is provided (258) and an auxiliary parameter zerosLeft is initialised to the value of total_zero (260). The parameter total_zeros specifies the number of zeros between the last non-zero coefficient in scan order and the start of the scan. In the above example, total_zeros is 3 (coefficient numbers 3, 5 and 6). Thus, zerosLeft is initialised to 3.

For each of the non-zero transform coefficients except the last one with respect to the reverse scan order (coefficient number 0), beginning with the last non-zero transform coefficient (coefficient number 7) with respect to the scan order (62), a parameter run_before is provided (64) indicating the length of the run of zero-level transform coefficients arranged directly in front of the respective non-zero transform coefficient when seen in scan order. For example, for i being equal to zero, the last non-zero transform coefficient with respect to the scan order is the non-zero transform coefficient in question. In our example, this is transform coefficient having the number 7 and having the level 1. The run of zeros in front of this transform coefficient has a length of 2, i.e. transform coefficients 5 and 6. Thus, in our example, the first run_before-parameter is 2. This parameter is temporarily stored in auxiliary vector coefficient run[0] (266). This is repeated in reverse scan order for run[i], with i being the count of the non-zero transform coefficients when scanned in reverse scan order. By decreasing the auxiliary parameter zerosLeft by the parameter run_before in each round of the for-loop (261) it is determined for each round as to how many zero-level transform coefficients are left. If zerosLeft is zero, no run_before-parameter is provided anymore (270) and the remaining coefficients of the vector run are set to zero (272). In any case, no run_before-parameter is provided for the last non-zero transform coefficient when stepped through in reverse scan order, i.e. non run_before-parameter for the first non-zero transform coefficient with respect to the scan order. This parameter is deduced from the number of zero-level transform coefficients left, as indicated by the auxiliary parameter zerosLeft (274). In our example, the auxiliary vector coefficients of the vector run are run[0]=2, run[1]=1, run[2]=0, run[3]=0, and run[4]=0.

At the end, in the for-loop indicated at 276, the values of the transform coefficient levels as stored in auxiliary vector level are assigned to their positions by copying the values of the coefficients of vector level to the respective position in the one-dimensional array coeffLevel. To be more specific, in the first round of the for-loop 276, i=4 and coeffNum which has been initialised to 0 (278) is incremented by run[4]+1=0+1=1 resulting in coeffNum=0 and coeffLevel[0] being assigned the value of level[4]=7. This is repeated for the next auxiliary vector coefficients level[3] to level [0]. Since the remaining positions of the array coeffLevel have been initialised to the value of zero (280) all transform coefficients have been coded.

The bold written syntax elements in FIG. 8 may be coded into the respective sub-data stream by means of variable length coding, for example.

FIG. 9 shows another example for coding a transform block. In this example, the scanning order manifests itself in "ii++" within the while-loop 310 indicating that counting parameters i is incremented per while-loop iteration.

For each coefficient in scanning order, a one-bit symbol significant_coeff_flag is provided (312). If the significant_coeff_flag symbol is 1 (314), i.e., if a non-zero coefficient exists at this scanning position i, a further one-bit symbol last_significant_coeff_flag is provided (316). This symbol indicates if a current significant coefficient is the last one inside the block or if further significant coefficients follow in scan order. Thus, if the last_significant_coeff_flag symbol is one (318), this indicates that the number of coefficients, i.e. numCoeff, is i+1 (320) and the levels of the subsequent transform coefficients can be deduced to be zero (322). In so far, the syntax elements last_significant_coeff_flag and significant_coeff_flag may be seen as a significance map. Then, for the last transform coefficient in scanning order, the absolute value of the level minus 1, i.e. coeff_abs_level_minus1, and its sign, i.e. coeff_sign_flag, is provided (324), thereby indicating the transform coefficient level of this last significant transform coefficient (326). These steps 324, 326 are repeated (328) for the remaining significant (330) transform coefficients in reverse scanning order (332), wherein the reverse scan order manifests itself in i--, i.e. i=i-1, indicating that counting parameter i is decremented per round in the for-loop. The parsing of the syntax elements coeff_abs_level_minus1 begins with deriving a binarization for the possible values of the syntax element. The binarization scheme may be a UEG0, i.e. a concatenated unary/zero-th order Exp-Golomb binarization process. Depending on the possible binarizations, the respective syntax element may be binary arithmetically coded bin by bin. In this regard, a context adaptive binary arithmetic coding scheme may be used for a prefix part of the binarization of coeff_abs_level_minus1 while using a decode bypass process having no adaptation for a suffix part.

For sake of completeness, it is noted that it became clear from FIG. 5 that the number of distinguishable scan positions within the 8×8 transform blocks is 64 whereas the number of distinguishable scan positions within the 4×4 transform blocks is merely 16. Accordingly, the abovementioned syntax element scan_idx_start and scan_idx_end may either be defined in an accuracy enabling a distinction between all 64 scan positions, or merely a distinction between 16 scan positions. In the latter case for example, the syntax elements may be applied to each quadruple of consecutive transform coefficients within the 8×8 transform blocks. To be more precise, 8×8 transform blocks may be coded by use of residual_block (LumaLevel8x8,
4*scan_idx_start, 4*scan_ids_end +3, 64)

and in case of 4×4 transform blocks by use of residual_block (LumaLevel4x4,
scan_idx_start, scan_idx_end, 16).

with residual_block being either residual_block_cavlc or residual_block_cabac, and LumaLevel4×4 and LumaLevel8×8 indicating an array of luma samples of the respective 4×4 and 8×8 transform block, respectively. As can be seen, scan_idx_start and scan_idx_end are defined to discriminate between 16 scan positions so that they indicate the range of positions in 4×4 blocks exactly. However, in 8×8 blocks, the accuracy of these syntax elements is not sufficient so that in these blocks the range is adjusted quadruple wise.

Furthermore, 8×8 blocks of transform coefficients can also be encoded by partitioning the 64 coefficients of an 8×8 block into 4 sets of 16 coefficients, for example by placing every fourth coefficient into the n-th set starting with coefficient n with n in the range of 0 to 3, inclusive, and coding each set of 16 coefficients using the residual block syntax for 4×4 blocks. At the decoder side, these 4 sets of 16 coefficients are recombined to form a set of 64 coefficients representing an 8×8 block.

Figure 10:
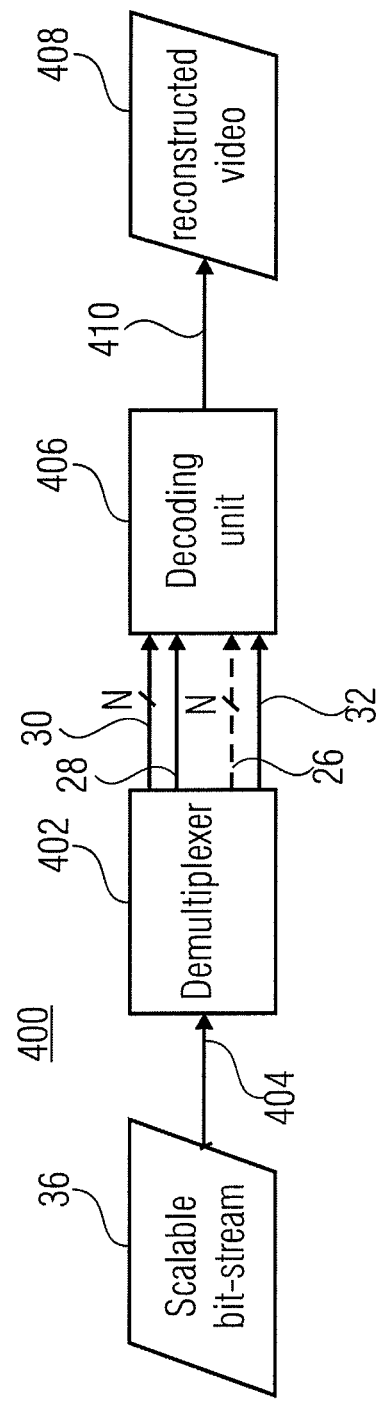
FIG. 10 a block diagram of a decoder according to another embodiment.
Figure 11:
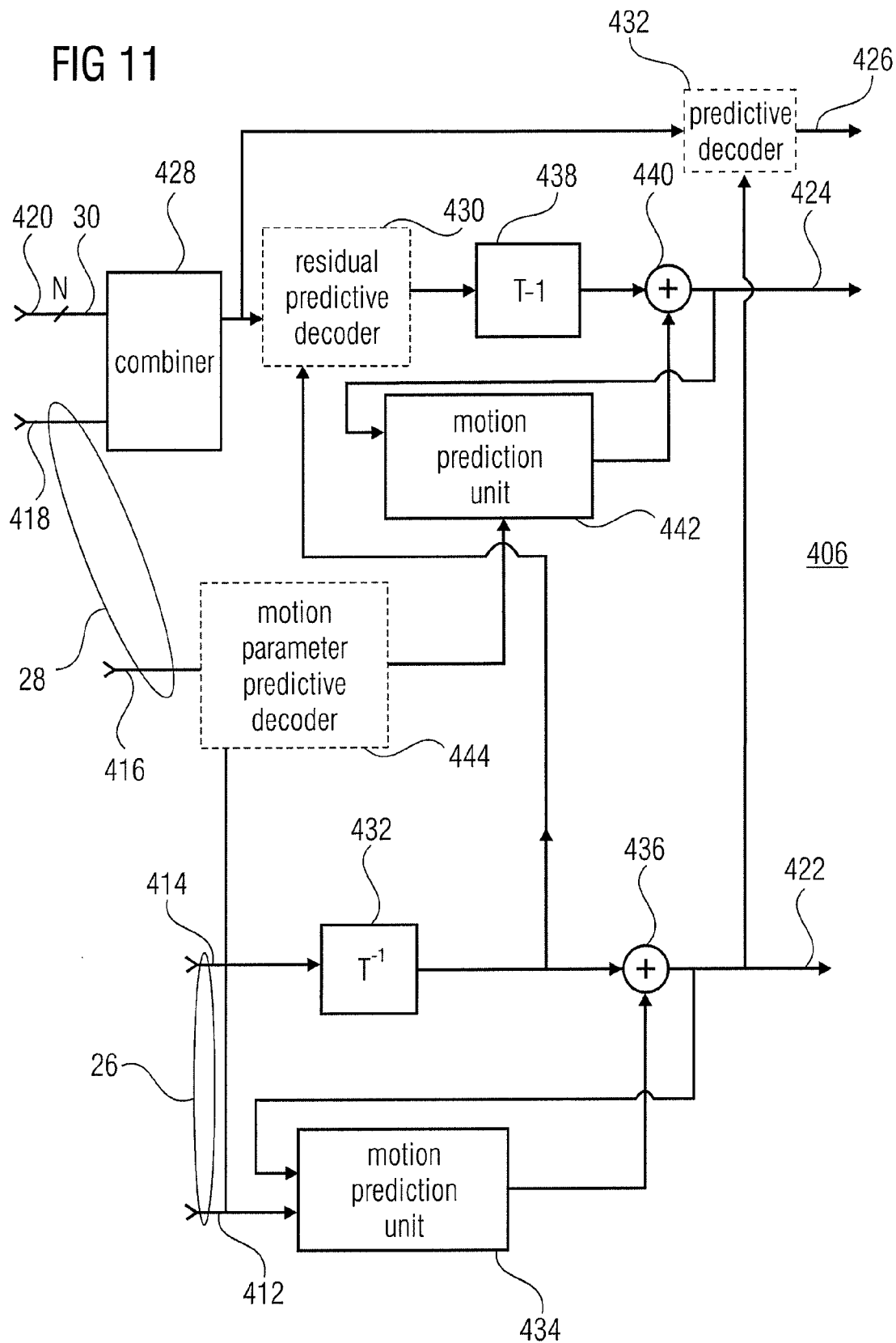
FIG. 11 a block diagram of an embodiment for the decoding unit of FIG. 10.

After having described embodiments for an encoder, a decoder for decoding the respective quality scalable data stream is explained with respect to FIGS. 10 and 11. FIG. 10 shows the general construction of a decoder 400. The decoder 400 comprises a demultiplexer 402 having an input 404 for receiving the scalable bit-stream 36. The demultiplexer 402 demulitplexes the input signal 36 into the data streams 26 to 32. To this end, the demultiplexer may perform a decoding and/or parsing function. For example, the demultiplexer 402 may decode the transform block codings of FIGS. 8 and 9. Further, recall FIGS. 6a-6g. Accordingly, demultiplexer 402, may use information of preceding sub-data streams in order to, in parsing a current sub-data stream, know how many transform coefficient values or contribution values are to be expected for a specific transform block. The data-streams thus retrieved are received by a decoding unit 406 which, based on these data-streams, reconstructs the video 18 and outputs the respective reconstructed video 408 at a respective output 410.

The internal structure of the decoding unit 406 is shown in more detail in FIG. 11. As shown therein, the decoding unit 406 comprises a base layer motion data input 412, a base layer residual data input 414, a zero order refinement layer motion data input 416, an optional transform coefficient zero order refinement transform coefficient data input 418 and an input 420 for the sub-data streams 30. As shown, inputs 412 and 414 are for receiving data-stream 26, whereas inputs 416 and 418 cooperate to receive data-stream 28. Besides this, the decoding unit 406 comprises a lower quality reconstruction video signal output 422, a higher quality interlayer coded reconstruction video signal output 424, and an internally coded reconstruction video signal output 426, the latter ones providing the information for a higher quality video signal.

A combiner 428 has inputs connected to inputs 418 and 420 and an output for outputting transform coefficient levels for the individual transform blocks as obtained by collecting the corresponding contribution values from the various quality layers. The collection may involve a sum over the contribution values for a specific transform coefficient within several of the data-streams 30 und 28.

However, it is also possible that combiner 428 presets all transform coefficient values to zero and replaces any of these zeros merely in case of an contribution value being unequal to zero for the respective scan position. By this measure, the combiner collects information on the transform coefficients of the various transform blocks. The association of the contribution or transform coefficient values within the individual layers may involve the combiner using the scan position information of the current layer such as scan_idx_start and/or scan_idx_end. Alternatively, the combiner may use the knowledge of the transform coefficient values within the individual transform blocks received so far from lower quality or SNR layers.

The transform blocks output by combiner 428 are received by a residual predictive decoder 430 and an adder 432.

Between the residual predictive decoder 430 and the input 414, an back or inverse transformation unit 432 is connected in order to forward inversely transformed residual data to the residual predictive decoder 430. The latter uses the inversely transformed residual data in order to obtain a predictor to be added to the transform coefficients of the transform blocks output by combiner 428, eventually after performing an up-sampling or another quality adaptation. On the other hand, a motion prediction unit 434 is connected between the input 412 and an input of an adder 436. Another input of the adder 436 is connected to the output of a back-transformation unit 432. By this measure, the motion prediction unit 434 uses the motion data on input 412 to generate a prediction signal for the inversely transformed residual signal output by the back-transformation unit 432. A result of adder 436 at the output of adder 436 is a reconstructed base layer video signal. The output of adder 436 is connected to the output 432 as well as in input of predictive decoder 432. The predictive decoder 432 uses the reconstructed base layer signal as a prediction for the intra layer coded portions of the video content output by combiner 428, eventually by use of an up-sampling. On the other hand, the output of adder 436 is also connected to an input of motion prediction units 434 in order to enable that the motion prediction unit 434 uses the motion data at input 412 to generate a prediction signal to the second input of adder 436 based on the reconstructed signals from the base layer data stream. The predictively decoded transform coefficient values output by residual predictive decoder 430 are back-transformed by back-transformation unit 438. At the output of back-transformation unit 438, a higher quality residual video signal data results. This higher quality residual data video signal is added by an adder 440 with a motion predicted video signal output by a motion prediction unit 442. At the output of adder 440, the reconstructed high quality video signal results which reaches output 424 as well as a further input of motion prediction unit 442. The motion prediction unit 442 performs the motion prediction based on the reconstructed video signal output by adder 440 as well as the motion information output by a motion parameter prediction decoder 444 which is connected between input 416 and a respective input of motion prediction unit 442. The motion parameter predictive decoder 444 uses, on a macroblock selective basis, motion data from the base layer motion data input 412 as a predictor, and dependent on this data, outputs the motion data to the motion prediction unit 442 with using, for example, the motion vectors at input 416 as offset vectors to motion vectors at input 412.

The above described embodiments enable an increase in the granularity of SNR scalable coding on a picture/slice level in comparison to CGS/MGS coding as described in the introductory portion, but without the significant increase in complexity that is present in FGS coding. Furthermore, since it is believed that the feature of FGS that packets can be truncated will not widely be used, the bit-stream adaptation is possible by simple packet dropping.

The above described embodiments have the basic idea in common, to partition the transform coefficient levels of a traditional CGS/MGS packet as it is currently specified in the SVC draft into subsets, which are transmitted in different packets and different SNR refinement layers. As an example, the above described embodiments concerned the CGS/MGS coding with one base and one enhancement layer. Instead of the enhancement layer including, for each picture, macroblock modes, intra prediction modes, motion vectors, reference picture indices, other control parameters as well as transforms coefficient levels for all macroblocks, in order to increase the granularity of the SNR scalable coding, these data were distributed over different slices, different packets, and different enhancement layers. In the first enhancement layer, the macroblock modes, motion parameter, other control parameters as well as, optionally, a first subset of transform coefficient levels are transmitted. In the next enhancement layer, the same macroblock modes and motion vectors are used, but a second subset of transform coefficient levels are encoded. All transform coefficients that have already been transmitted in the first enhancement layer may be set to zero in the second and all following enhancement layers. In all following enhancement layers (third, etc.), the macroblock modes and motion parameters of the first enhancement layer are again used, but further subsets of transform coefficient levels are encoded.

It should be noted that this partitioning does not or only very slightly increases the complexity in comparison to the traditional CGS/MGS coding as specified in the current SVC draft. All SNR enhancements can be parsed in parallel, and the transform coefficients do not need to be collected from different scans over the picture/slice. That means for example that a decoder could parse all transform coefficients for a block from all SNR enhancements, and then it can apply the inverse transform for this block without storing the transform coefficient levels in a temporary buffer. When all blocks of a macroblock have been completely parsed, the motion compensated prediction can be applied and the final reconstruction signal for this macroblock can be obtained. It should be noted that all syntax elements in a slice are transmitted macroblock by macroblock, and inside a macroblock, the transform coefficient values are transmitted transform block by transform block.

It is possible that a flag is encoded at the slice level, which signals whether all macroblock modes and motion parameters are inferred from the base layer. Given the current syntax of CGS/MGS packets that means especially that all syntax elements mb_skip_run and mb_skip_flag are not transmitted but inferred to be equal to 0, that all syntax elements mb_field_decoding_flag are not transmitted but inferred to be equal to their values in the co-located base layer macroblocks, and that all syntax elements base_mode_flag and residual_prediction_flag are not transmitted but inferred to be equal to 1. In the first SNR enhancement layer this flag should usually set to 0, since for this enhancement it should be possible to transmit motion vectors that are different from the base layer in order to improve the coding efficiency. But in all further enhancement layers, this flag is set equal to 1, since these enhancement layers only represent a refinement of transform coefficient levels of scan positions that haven't been encoded in the previous SNR enhancement layers. And by setting this flag equal to 1, the coding efficiency can be improved for this case, since no transmission of non-required syntax elements is necessary and thus associated bit-rate is saved.

As further described above, the first scanning position x for the transform coefficient levels in the various transform blocks may be transmitted at a slice level, with no syntax elements being transmitted at a macroblock level for transform coefficients with a scanning position that is smaller than x. In addition to the above description where the first scanning position is transmitted only for a specific transform size and the first scanning position for other transform sizes is inferred based on the transmitted value, it would be possible to transmit a first scanning position for all supported transform sizes.

Similarly, the last scanning position y for the transform coefficient levels in the various transform blocks may be transmitted at a slice level, with no syntax elements being transmitted at a macroblock level for transform coefficients with a scanning position that is greater than y. Again, it is possible to either transmit a last scanning position for all supported transform sizes, or to transmit the last scanning position only for a specific transform size and to infer the last scanning position for other transform sizes based on the transmitted value.

The first scanning position for each transform block in an SNR enhancement layer may alternatively be inferred based on the transform coefficients that have been transmitted in a previous enhancement layer. This inference rule may independently applied to all transform blocks, and in each block a different first transform coefficient can be derived by, for example, combiner 428.

Further, a combination of signaling and inferring the first scanning position may be done. That means that the first scanning position may basically inferred based on already transmitted transform coefficient levels in previous SNR enhancement layers, but for this the additional knowledge is used that the first scanning position cannot be smaller than a value x, which is transmitted in the slice header. With this concept it is again possible to have a different first scanning index in each transform block, which can be chosen in order to maximize the coding efficiency.

As an even further alternative, the signaling of the first scan position, the inference of the first scan position, or the combination of them may be combined with the signaling of the last scanning position.

In so far, the above description enables a possible scheme allowing for SNR scalability in which only subsets of transform coefficient levels are transmitted in different SNR enhancement layers, and this mode is signaled by one or more slice header syntax elements, which specify that macroblock modes and motion parameters are inferred for all macroblock types and/or that transform coefficients for several scanning positions are not present at a transform block level. A slice level syntax element may be used that signals that the macroblock modes and motion parameters for all macroblock are inferred from the co-located base layer macroblocks. Specifically, the same macroblock modes and motion parameters may be used, and the corresponding syntax elements may not be transmitted at a slice level. The first scanning position x for all transform blocks may be signaled by slice header syntax elements. At the macroblock level, no syntax elements are transmitted for transform coefficient values of scanning positions smaller than x. Alternatively, the first scanning position for a transform block may be inferred based on the transmitted transform coefficient levels of the base layer. A combination of the latter alternatives is also possible. Similarly, the last scanning position y for all transform blocks may be signaled by slice header syntax elements, wherein, at the macroblock level, no syntax elements are transmitted for transform coefficient values of scanning positions greater than y.

As noted above, the detailed described embodiments of FIGS. 1-11 may be varied in various ways. For example, although the above embodiments were exemplified with respect to a two spatial layer environment, the above embodiments are readily transferable to an embodiment with only one quality layer or with more than one quality layer but with the N+1 SNR scalable refinement layers. Imagine, for example, that part 12 in FIG. 1 is missing. In this case, hybrid coder 42 acts as a coding means for coding the video signal 18 using block-wise transformation to obtain transform blocks 146, 148 of transformation coefficient values for a picture 140 of the video signal while unit 44 acts as a means for forming, for each of a plurality of quality layers, a video sub-data stream 30 or 28 plus 30 containing scan range information indicating a sub-set of the possible scan positions, and transform coefficient information on transformation coefficient values belonging to the sub-set of possible scan positions. No inter layer prediction would be involved. Moreover, coder 42 may be simplified to perform no motion prediction but merely block-wise transformation. Similarly, in the one quality layer case, demultiplexer 402 would act as a parsing means for parsing the video sub-data streams of the plurality of quality layers, to obtain, for each quality layer, the scan range information and the transform coefficient information, and the combiner 428 would act as a means for, using the scan range information, for each quality layer, constructing the transform blocks by associating the transformation coefficient values of the respective transform blocks from the transform coefficient information to the sub-set of the possible scan positions, with the back-transformation unit 438 reconstructing the picture of the video signal by a back-transformation of the transform blocks.

Furthermore, the embodiment in FIG. 1 may be varied in a way that the base layer coder 12 operates with the same spatial resolution and the same bit depth as the enhancement layer coder 14. In that case the embodiment represents SNR scalable coding with a standard base layer 26 and various enhancement layers 28, 30 that contain partitions of the transform coefficients.

Depending on an actual implementation, the inventive scheme can be implemented in hardware or in software. Therefore, the present invention also relates to a computer program, which can be stored on a computer-readable medium such as a CD, a disk or any other data carrier. The present invention is, therefore, also a computer program having a program code which, when executed on a computer, performs the inventive method in connection with the above figures.

Furthermore, it is noted that all steps or functions indicated in the flow diagrams could be implemented by respective means in the encoder and that the implementations may comprise subroutines running on a CPU, circuit parts of an ASIC or the like.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A hybrid video decoder for reconstructing a picture of a video signal from a quality-scalable video data stream comprising, for each of a plurality of quality layers, a video sub-data stream, the picture being partitioned into macroblocks each of which is partitioned into transform blocks of different transform sizes, the macroblocks being grouped into slices into which the picture is partitioned, comprising:

a parser for parsing the video sub-data streams of the plurality of quality layers, to acquire, for each quality layer, a scan range information at a slice level and, for each transform block, transform coefficient information on two-dimensionally arranged transformation coefficient values of the respective transform block, wherein a predetermined scan order with possible scan positions orders the transformation coefficient values into a linear sequence of transformation coefficient values, wherein the parser is configured to acquire the scan range information by reading, for each quality layer and each slice, two syntax elements a first one of which indicates, for a predetermined size of the different transform sizes, a first scan position among the possible scan positions within the sub-set of possible scan positions in the predetermined scan order and a second one of which indicates, for the predetermined size, a last scan position among the possible scan positions within the sub-set of possible scan positions in the predetermined scan order and infer, for transform sizes other than the predetermined transform size, the first scan position among the possible scan positions within the sub-set of possible scan positions in the predetermined scan order from the first syntax element and the last scan position among the possible scan positions within the sub-set of possible scan positions in the predetermined scan order from the second syntax element so that, for each transform block, the scan range information indicates a sub-set of the possible scan positions the sub-set forming a continuous sequence of the possible scan positions, wherein, for each quality level and transform block, the transform coefficient information comprises a contribution value for each transformation coefficient value at any of the possible scan positions of the sub-set indicated by the scan range information for the respective quality layer and the slice to which the respective transform block belongs;

a constructor for constructing the transform blocks by, using the scan range information, for each quality layer, associating the contribution values of the respective transform blocks to the sub-set of the possible scan positions and summing-up, for each possible scan position, the contribution values associated with the respective possible scan position in order to obtain the transform coefficient value at the respective possible scan position; and a reconstructor for reconstructing, using predictive decoding and switching between different prediction modes at macroblock level, the picture of the video signal by deriving a prediction residual signal via a back-transformation of the transform blocks.

2. The hybrid video decoder according to claim 1, wherein the parser is configured so that transform blocks of the predetermined transform size are 4×4 transform blocks, the transform blocks of transform sizes other than the predetermined transform size including 8×8 transform blocks wherein the parser is configured to multiply the first syntax element by 4 so as to infer the first scan position for the 8×8 transform blocks.

3. The hybrid video decoder according to claim 1, wherein the parser is configured to decode the transformation coefficient values belonging to the sub-set of possible scan positions in a block-wise manner from the transform coefficient information so that the contribution values belonging to the sub-set of possible scan positions of a predetermined transform block are decoded from a continuous portion of the transform coefficient information.

4. The hybrid video decoder according to claim 3, wherein the parser is configured to decode the consecutive portion by decoding a significance map specifying positions of the contribution values being unequal to zero and belonging to the sub-set of possible scan positions in the predetermined transform block into the video sub-data stream, and subsequently in a reverse scan order reversed relative to the predetermined scan order—starting with the last contribution value being unequal to zero and belonging to the sub-set of possible scan positions within the predetermined transform block—decoding the contribution values being unequal to zero and belonging to the sub-set of possible scan positions within the predetermined transform block.

5. The hybrid video decoder according to claim 4, wherein the parser is configured to decode the significance map by in the predetermined scan order, decoding a significance flag per contribution value belonging to the sub-set of possible scan positions from the first contribution value belonging to the sub-set of possible scan positions to the last contribution value belonging to the sub-set of possible scan positions and being unequal to zero, with the significance flags depending on the respective contribution value being zero or unequal to zero, and following each significance flag of a respective contribution value being unequal to zero, decoding a last-flag depending on the respective contribution value being the last contribution value belonging to the sub-sets of possible scan positions within the predetermined transform block being non-zero or not.

6. The hybrid video decoder according to claim 3, wherein the parser is configured to decode the consecutive portion by decoding a significance information specifying the number of contribution values being unequal to zero and belonging to the sub-set of possible scan positions within the predetermined transform block as well as the number of consecutive trailing contribution values comprising an absolute value of one within the number of contribution values being unequal to zero and belonging to the sub-set of possible scan positions within the predetermined transform block;

decoding the signs of the consecutive trailing contribution values and the remaining contribution values being unequal to zero and belonging to the sub-set of possible scan positions within the predetermined transform block;

decoding the total number of contribution values being equal to zero and belonging to the sub-set of possible scan positions up to the last contribution value being unequal to zero and belonging to the sub-set of possible scan positions within the predetermined transform block;

decoding the number of consecutive contribution values being equal to zero and belonging to the sub-set of possible scan positions immediately preceding any of the number of contribution values being unequal to zero and belonging to the sub-set of possible scan positions within the predetermined transform block in a reversed scan order.

7. The hybrid video decoder according to claim 1, wherein the predetermined scan order scans the transformation coefficient values of the transform blocks such that transformation coefficient values belonging to a higher scan position in the predetermined scan order relate to higher spatial frequencies.

8. The hybrid video decoder according to claim 1, wherein the reconstructor is configured to reconstruct the picture of the video signal using motion-prediction based on motion information and by combining a motion-prediction result with the prediction residual signal.

9. The hybrid video decoder according to claim 8, wherein the parser is configured to decode from each sub-data stream an indication indicating motion information existence or motion information non-existence for the respective quality layer, and that the sub-data stream of a first of the quality layers comprises the motion information and comprises the indication indicating motion information existence, or the indication within the sub-data stream of the first quality layer indicates the motion information non-existence with a part of the quality-scalable video data stream other than the sub-data streams comprising the motion information, and decode from the sub-data stream(s) of the other quality layer(s) the indication indicating motion information non-existence.

10. The hybrid video decoder according to claim 9, wherein the parser is configured to decode from the sub-data stream of the first quality layer the indication indicating motion information existence, with the motion information being equal to the higher-quality motion information or equal to a refinement information allowing a reconstruction of the higher-quality motion information based on the lower-quality motion information, and that the part of the quality-scalable video data stream also comprises the lower-quality motion information.

11. The hybrid video decoder according to claim 9, wherein the parser is configured such that the motion information and the indication relate to a macroblock of the picture.

12. The hybrid video decoder according to claim 1, wherein the parser is configured to parse each sub-data stream individually independently—with regard to a parsing result—from the other sub-data stream(s).

13. The hybrid video decoder according to claim 12, wherein the constructor is configured to associate the respective transform coefficient information with the transformation coefficient values, with the association result being independent of the other sub-data stream(s).

14. The hybrid video decoder according to claim 13, wherein a layer order is defined among the quality layers, and the sub-data stream of a first quality layer in the layer order enables an association of the respective transform coefficient information with the transformation coefficient values independent of the sub-data stream(s) of the following quality layer(s), whereas the sub-data stream(s) of the following quality layers in layer order enable an association of the respective transform coefficient information with the transformation coefficient values merely in combination with the sub-data stream(s) of (a) quality layer(s) preceding the respective quality layer, wherein the constructor is configured to associate the transform coefficient information of a respective quality layer with the transformation coefficient values by use of the sub-data streams of the respective quality layer and quality layer(s) preceding the respective quality layer.

15. A hybrid video encoder for coding a picture of a video signal into a quality-scalable video data stream, the picture being partitioned into macroblocks each of which is partitioned into transform blocks of different transform sizes, the macroblocks being grouped into slices into which the picture is partitioned, comprising:

a coder for coding a video signal using predictive coding and switching between different prediction modes at macroblock level and block-wise transformation of a prediction residual signal into the transform blocks of two-dimensionally arranged transformation coefficient values, wherein a predetermined scan order with possible scan positions orders the transformation coefficient values into a linear sequence of transformation coefficient values; and a generator for forming, for each of a plurality of quality layers, a video sub-data stream comprising scan range information indicating a sub-set of the possible scan positions, the sub-set forming a continuous sequence of the possible scan positions, and transform coefficient information on transformation coefficient values belonging to the sub-set of possible scan positions, wherein the generator is configured such that the scan range information is signaled, for each quality layer and each slice, by two syntax elements a first one of which indicates, for a predetermined size of the different transform sizes, a first scan position among the possible scan positions within the sub-set of possible scan positions in the predetermined scan order and a second one of which indicates, for the predetermined size, a last scan position among the possible scan positions within the sub-set of possible scan positions in the predetermined scan order wherein, for transform sizes other than the predetermined transform size, the first scan position among the possible scan positions within the sub-set of possible scan positions in the predetermined scan order is inferable from the first syntax element and the last scan position among the possible scan positions within the sub-set of possible scan positions in the predetermined scan order is inferable from the second syntax element.

16. A method for generating a quality-scalable video data stream, comprising:

coding a video signal using block-wise transformation to acquire transform blocks of two-dimensionally arranged transformation coefficient values for a picture of the video signal, wherein a predetermined scan order with possible scan positions $\{1, \ldots, M\}$ orders the transformation coefficient values into a linear sequence of transformation coefficient values; and forming, for each of a plurality of quality layers j, a video sub-data stream comprising scan range information indicating a sub-set $\{X_j, \ldots, Y_j\}$ of the possible scan positions $\{1, \ldots, M\}$ with $X_j, Y_j \in \{1, \ldots, M\}$, the sub-set forming a continuous sequence of the possible scan positions, and transform coefficient information comprising a contribution value $a_{i,j}$ for all $i \in \{X_j, \ldots, Y_j\}$, wherein the forming is performed such that, for each of the plurality of quality layers j, the scan range information comprises two syntax elements one of which indicates a first scan position $X_j$ among the possible scan positions within the sub-set $\{X_j, \ldots, Y_j\}$ of possible scan positions in the predetermined scan order and the other one of which indicates a last scan position $Y_j$ among the possible scan positions within the sub-set $\{X_j, \ldots, Y_j\}$ of possible scan positions in the predetermined scan order, and such that summing-up, for each possible scan position, equally weighted, the contribution values associated with the respective possible scan position according to the respective scan range information, yields the transform coefficient value at the respective possible scan position.

17. A method for reconstructing a video signal from a quality-scalable video data stream comprising, for each of a plurality of quality layers, a video sub-data stream, comprising:

parsing the video sub-data streams of the plurality of quality layers, to acquire, for each quality layer j, a scan range information and transform coefficient information on two-dimensionally arranged transformation coefficient values of a transform block, wherein a predetermined scan order with possible scan positions $\{1, \ldots, M\}$ orders the transformation coefficient values into a linear sequence of transformation coefficient values, and the scan range information indicates a sub-set $\{X_j, \ldots, Y_j\}$ of the possible scan positions $\{1, \ldots, M\}$ with $X_j, Y_j \in \{1, \ldots, M\}$, the sub-set forming a continuous sequence of the possible scan positions, and the transform coefficient information comprises a contribution value $a_{i,j}$ for all $i \in \{X_j, \ldots, Y_j\}$;

constructing the transform block by, using the scan range information, for each quality layer j, associating the contribution values $a_{i,j}$ of the transform block to the sub-set $\{X_j, \ldots, Y_j\}$ of the possible scan positions and summing-up, for each possible scan position i, the contribution values $a_{i,j}$ associated with the respective possible scan position i according to $$\sum_j a_{i,j}$$

in order to obtain the transform coefficient value at the respective possible scan position; and reconstructing a picture of the video signal by a back-transformation of the transform block, wherein acquiring the scan range information comprises, for each of the plurality of quality layers j, reading two syntax elements one of which indicates a first scan position $X_j$ among the possible scan positions within the sub-set $\{X_j, \ldots, Y_j\}$ of possible scan positions in the predetermined scan order and the other one of which indicates a last scan position $Y_j$ among the possible scan positions within the sub-set $\{X_j, \ldots, Y_j\}$ of possible scan positions in the predetermined scan order.

18. A non-transitory computer-readable medium having stored thereon a computer-program comprising a program code for performing, when running on a computer, a method for generating a quality-scalable video data stream, the method comprising:

coding a video signal using block-wise transformation to acquire transform blocks of two-dimensionally arranged transformation coefficient values for a picture of the video signal, wherein a predetermined scan order with possible scan positions $\{1, \ldots, M\}$ orders the transformation coefficient values into a linear sequence of transformation coefficient values; and forming, for each of a plurality of quality layers j, a video sub-data stream comprising scan range information indicating a sub-set $\{X_j, \ldots, Y_j\}$ of the possible scan positions $\{1, \ldots, M\}$ with $X_j, Y_j \in \{1, \ldots, M\}$, the sub-set forming a continuous sequence of the possible scan positions, and transform coefficient information comprising a contribution value $a_{i,j}$ for all $i \in \{X_j, \ldots, Y_j\}$, wherein the forming is performed such that, for each of the plurality of quality layers j, the scan range information comprises two syntax elements one of which indicates a first scan position $X_j$ among the possible scan positions within the sub-set $\{X_j, \ldots, Y_j\}$ of possible scan positions in the predetermined scan order and the other one of which indicates a last scan position $Y_j$ among the possible scan positions within the sub-set $\{X_j, \ldots, Y_j\}$ of possible scan positions in the predetermined scan order, and such that summing-up, for each possible scan position, equally weighted, the contribution values associated with the respective possible scan position according to the respective scan range information, yields the transform coefficient value at the respective possible scan position.

19. A non-transitory computer-readable medium having stored thereon a computer-program comprising a program code for performing, when running on a computer, a method for reconstructing a video signal from a quality-scalable video data stream comprising, for each of a plurality of quality layers, a video sub-data stream, the method comprising:

parsing the video sub-data streams of the plurality of quality layers, to acquire, for each quality layer j, a scan range information and transform coefficient information on two-dimensionally arranged transformation coefficient values of a transform block, wherein a predetermined scan order with possible scan positions $\{1, \ldots, M\}$ orders the transformation coefficient values into a linear sequence of transformation coefficient values, and the scan range information indicates a sub-set $\{X_j, \ldots, Y_j\}$ of the possible scan positions $\{1, \ldots, M\}$ with $X_j, Y_j \in \{1, \ldots, M\}$, the sub-set forming a continuous sequence of the possible scan positions, and the transform coefficient information comprises a contribution value $a_{i,j}$ for all $i \in \{X_j, \ldots, Y_j\}$, constructing the transform block by, using the scan range information, for each quality layer j, associating the contribution values $a_{i,j}$ of the transform block to the sub-set $\{X_j, \ldots, Y_j\}$ of the possible scan positions and summing-up, for each possible scan position i, the contribution values $a_{i,j}$ associated with the respective possible scan position i according to $$\sum_j a_{i,j}$$

in order to obtain the transform coefficient value at the respective possible scan position; and reconstructing a picture of the video signal by a back-transformation of the transform block, wherein acquiring the scan range information comprises, for each of the plurality of quality layers j, reading two syntax elements one of which indicates a first scan position $X_j$ among the possible scan positions within the sub-set $\{X_j, \ldots, Y_j\}$ of possible scan positions in the predetermined scan order and the other one of which indicates a last scan position $Y_j$ among the possible scan positions within the sub-set $\{X_j, \ldots, Y_j\}$ of possible scan positions in the predetermined scan order.

* * * * *